(12) United States Patent
Kang

(10) Patent No.: US 12,535,910 B2
(45) Date of Patent: Jan. 27, 2026

(54) DISPLAY DEVICE

(71) Applicant: LG Display Co., Ltd., Seoul (KR)

(72) Inventor: HyeongWon Kang, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/979,109

(22) Filed: Dec. 12, 2024

(65) Prior Publication Data

US 2025/0271961 A1 Aug. 28, 2025

(30) Foreign Application Priority Data

Feb. 27, 2024 (KR) .......................... 10-2024-0027935

(51) Int. Cl.
G06F 3/041 (2006.01)
G06F 3/044 (2006.01)

(52) U.S. Cl.
CPC ...... *G06F 3/04164* (2019.05); *G06F 3/04166* (2019.05); *G06F 3/0446* (2019.05); *G06F 2203/04108* (2013.01)

(58) Field of Classification Search
None
See application file for complete search history.

(56) References Cited

U.S. PATENT DOCUMENTS

| | | | |
|---|---|---|---|
| 9,134,824 B2 | 9/2015 | Kang et al. | |
| 9,665,221 B2 | 5/2017 | Han et al. | |
| 2013/0063395 A1* | 3/2013 | Byun | G06F 3/04184 345/173 |
| 2013/0249825 A1 | 9/2013 | Kang et al. | |
| 2015/0185914 A1 | 7/2015 | Han et al. | |
| 2020/0210046 A1* | 7/2020 | Lee | G06F 3/044 |
| 2024/0160314 A1* | 5/2024 | Jeon | G06F 3/04166 |

FOREIGN PATENT DOCUMENTS

| | | |
|---|---|---|
| KR | 10-1318447 B1 | 10/2013 |
| KR | 10-2112092 B1 | 5/2020 |

* cited by examiner

*Primary Examiner* — Krishna P Neupane
(74) *Attorney, Agent, or Firm* — Fenwick & West LLP

(57) ABSTRACT

A display device for determining whether a touch occurs by using a first copy touch sensing signal and a second copy touch sensing signal corresponding to a touch sensing signal transmitted from a touch receiving electrode line is disclosed. The display device comprises an image panel having pixels, a touch panel including touch driving electrodes and touch receiving electrodes provided on the image panel, and a touch driver for sensing a touch on the touch panel, wherein the touch driver determines whether a touch occurs in the touch panel by using a first copy touch sensing signal and a second copy touch sensing signal corresponding to a touch sensing signal transmitted from a touch receiving electrode line connected to the touch receiving electrode.

13 Claims, 13 Drawing Sheets

DISPLAY DEVICE

CROSS-REFERENCE TO RELATED APPLICATION

This application claims the benefit of the Republic of Korea Patent Application No. 10-2024-0027935 filed on Feb. 27, 2024, which is hereby incorporated by reference in its entirety.

BACKGROUND

Field of Technology

The present disclosure relates to a display device.

Discussion of the Related Art

Display devices are mounted on or provided in electronic products such as televisions, monitors, notebook computers, smart phones, tablet computers, electronic pads, wearable devices, watch phones, portable information devices, navigation devices, or vehicle control display devices, etc., to display images.

A display device can be provided with a touch panel capable of sensing a touch.

In a display device provided with a touch panel, a touch by contact and a touch by non-contact need to be recognized.

However, in conventional display devices, it is difficult to accurately recognize touches by contact and touches by non-contact.

SUMMARY

Accordingly, the present disclosure is directed to providing a display device that substantially obviates one or more problems due to limitations and disadvantages of the related art.

An embodiment of the present disclosure is directed to providing a display device for determining whether a touch occurs by using a first copy touch sensing signal and a second copy touch sensing signal corresponding to a touch sensing signal transmitted from a touch receiving electrode line.

Additional advantages and features of the disclosure will be set forth in part in the description which follows and in part will become apparent to those having ordinary skill in the art upon examination of the following or can be learned from practice of the disclosure. The objectives and other advantages of the disclosure can be realized and attained by the structure particularly pointed out in the written description as well as the appended drawings.

To achieve these and other advantages and in accordance with the purpose of the disclosure, as embodied and broadly described herein, there is provided a display device comprising an image panel having pixels, a touch panel including touch driving electrodes and touch receiving electrodes provided on the image panel, and a touch driver for sensing a touch on the touch panel, wherein the touch driver determines whether a touch occurs in the touch panel by using a first copy touch sensing signal and a second copy touch sensing signal corresponding to a touch sensing signal transmitted from a touch receiving electrode line connected to the touch receiving electrode.

It is to be understood that both the foregoing general description and the following detailed description of the present disclosure are example and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION

Figure 1:
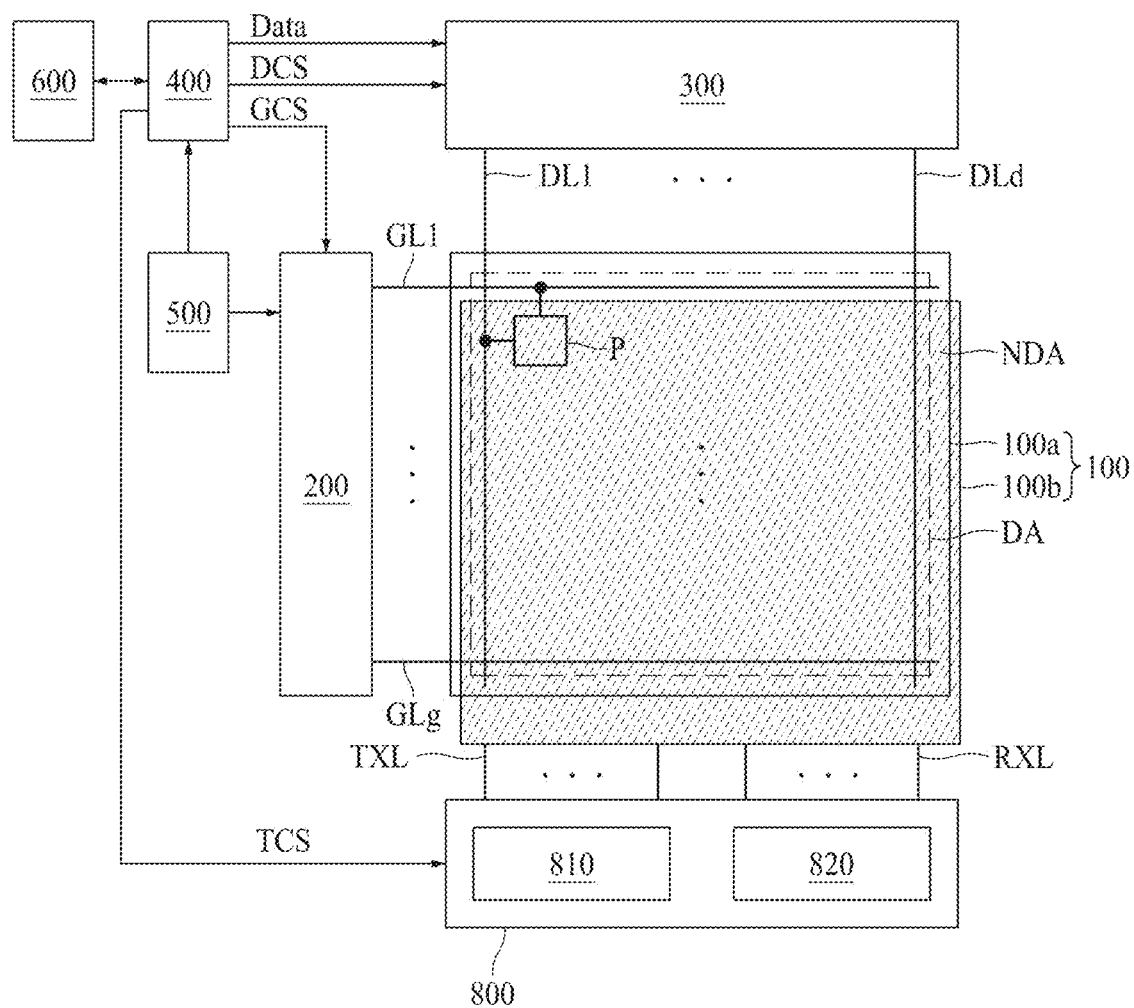
FIG. 1 is an exemplary diagram illustrating a configuration of a display device according to an embodiment of the present disclosure.

Reference will now be made in detail to the exemplary embodiments of the present disclosure, examples of which are illustrated in the accompanying drawings. Wherever possible, the same reference numbers will be used throughout the drawings to refer to the same or like parts.

Advantages and features of the present disclosure, and implementation methods thereof will be clarified through following embodiments described with reference to the accompanying drawings. The present disclosure can, however, be embodied in different forms and should not be construed as limited to the embodiments set forth herein. Rather, these embodiments are provided so that this disclosure will be thorough and complete, and will fully convey the scope of the present disclosure to those skilled in the art.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted. When "comprise," "have," and "include" described in the present disclosure are used, another part can be added unless "only" is used. The terms of a singular form can include plural forms unless referred to the contrary.

In construing an element, the element is construed as including an error or tolerance range although there is no explicit description of such an error or tolerance range.

In describing a position relationship, for example, when a position relation between two parts is described as, for example, "on," "over," "under," and "next," one or more other parts can be disposed between the two parts unless a more limiting term, such as "just" or "direct(ly)" is used.

In describing a time relationship, for example, when the temporal order is described as, for example, "after," "subsequent," "next," and "before," a case that is not continuous can be included unless a more limiting term, such as "just," "immediate(ly)," or "direct(ly)" is used.

It will be understood that, although the terms "first," "second," etc. can be used herein to describe various elements, these elements should not be limited by these terms. These terms are only used to distinguish one element from another and may not define order of sequence. For example, a first element could be termed a second element, and, similarly, a second element could be termed a first element, without departing from the scope of the present disclosure.

In describing elements of the present disclosure, the terms "first," "second," "A," "B," "(a)," "(b)," etc. can be used. These terms are intended to identify the corresponding elements from the other elements, and basis, order, or number of the corresponding elements should not be limited by these terms. The expression that an element is "connected," "coupled," or "adhered" to another element or layer should be understood the element or layer cannot only be directly connected or adhered to another element or layer, but also be indirectly connected or adhered to another element or layer with one or more intervening elements or layers "disposed," or "interposed" between the elements or layers, unless otherwise specified.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item. Also, the term "can" used herein includes all meanings and definitions of the word "may."

Features of various embodiments of the present disclosure can be partially or overall coupled to or combined with each other and can be variously inter-operated with each other and driven technically as those skilled in the art can sufficiently understand. The embodiments of the present disclosure can be carried out independently from each other or can be carried out together in co-dependent relationship.

Hereinafter, embodiments of the present disclosure will be described in detail with reference to the accompanying drawings.

Figure 2:
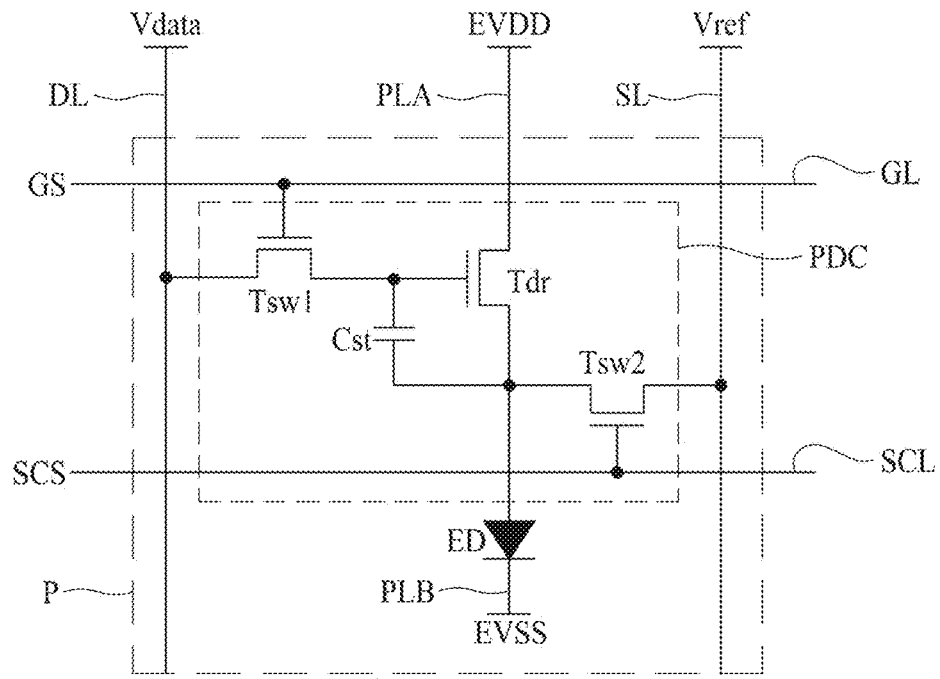
FIG. 2 is an exemplary diagram illustrating a structure of a pixel applied to a display device according to an embodiment of the present disclosure.
Figure 3:
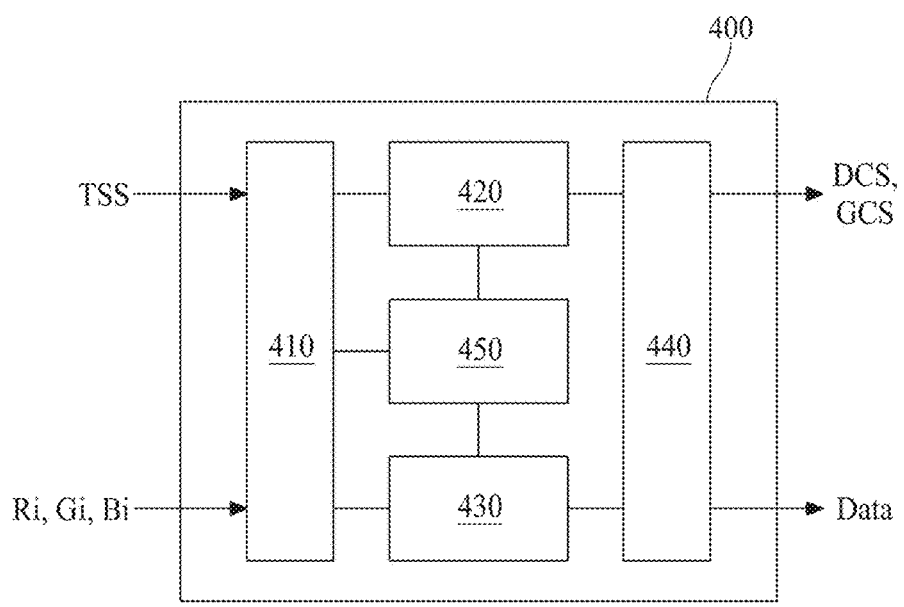
FIG. 3 is an exemplary diagram illustrating a structure of a control driver applied to a display device according to an embodiment of the present disclosure.
Figure 4:
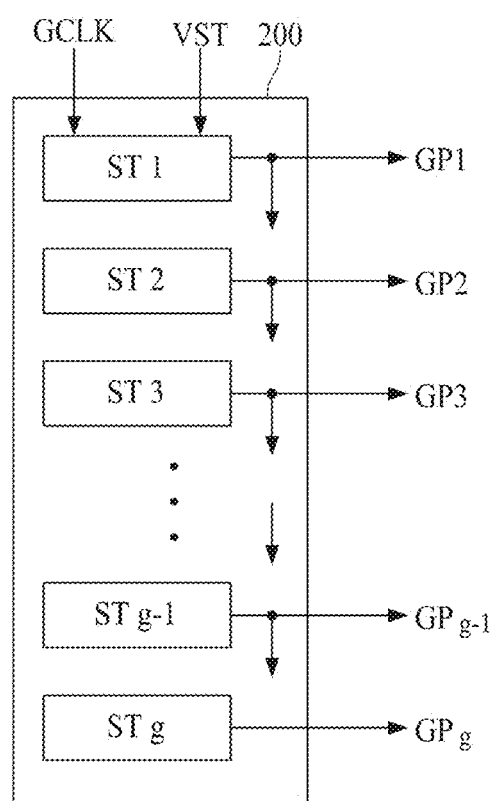
FIG. 4 is an exemplary diagram illustrating a structure of a gate driver applied to a display device according to an embodiment of the present disclosure.
Figure 5:
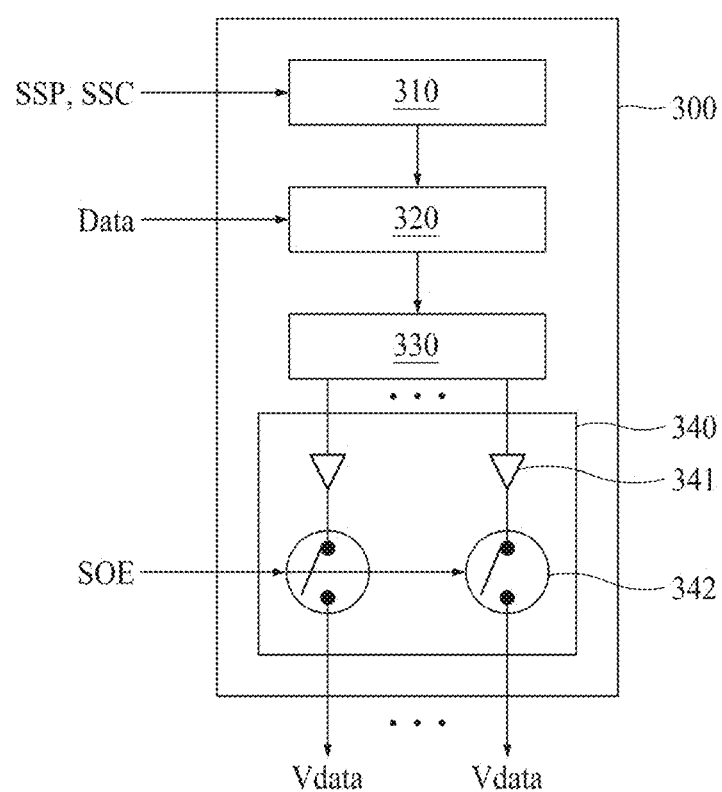
FIG. 5 is an exemplary diagram illustrating a structure of a data driver applied to a display device according to an embodiment of the present disclosure.

FIG. 1 is an exemplary diagram illustrating a configuration of a display device according to an embodiment of the present disclosure, FIG. 2 is an exemplary diagram illustrating a structure of a pixel applied to a display device according to an embodiment of the present disclosure, FIG. 3 is an exemplary diagram illustrating a structure of a control driver applied to a display device according to an embodiment of the present disclosure, FIG. 4 is an exemplary diagram illustrating a structure of a gate driver applied to a display device according to an embodiment of the present disclosure, and FIG. 5 is an exemplary diagram illustrating a structure of a data driver applied to a display device according to an embodiment of the present disclosure.

A display device according to an embodiment of the present disclosure can be used as various kinds of electronic devices. Electronic devices can be, for example, televisions, monitors, etc.

In addition, the electronic device can be, for example, a wearable device worn on a user's body. In particular, the wearable device can be worn on a user's wrist or the like.

A display device according to an embodiment of the present disclosure, as illustrated in FIG. 1, can include a display panel 100 which includes a display area DA displaying an image and a non-display area NDA provided outside the display area DA, a gate driver 200 which supplies gate signals GS to a plurality of gate lines GL1 to GLg provided in the display area DA of the display panel 100, a data driver 300 which supplies data voltages Vdata to a plurality of data lines DL1 to DLd provided in the display area DA of the display panel 100, a touch driver 800 which supplies a touch driving signal to touch electrodes provided in the display panel 100 and determines a touch by using touch sensing signals received from the touch electrodes, a control driver 400 which controls driving of the gate driver 200, the data driver 300, and the touch driver 800, and a power supply unit 500 which supplies power to the control driver 400, the gate driver 200, the data driver 300, the touch driver 800 and the display panel 100.

First, the display panel 100 includes an image panel 100*a* displaying an image and a touch panel 100*b* in which touch electrodes for a touch sensing are disposed.

The image panel 100*a* can include a display area DA and a non-display area NDA. Gate lines GL1 to GLg, data lines DL1 to DLd, and pixels P can be provided in the display area DA. Accordingly, an image can be displayed in the display area DA. Here, g and d are natural numbers. The non-display area NDA can surround the outer periphery of the display area DA.

The image panel 100*a* may be a light emitting display panel provided with light emitting elements that output light by itself, but may be a liquid crystal display panel that transmits light transmitted from a backlight, or may be any one of various types of panels currently used for image display.

Hereinafter, for convenience of description, a light emitting display panel is described as an example of the image panel 100*a*.

For example, a pixel P included in the image panel 100*a* including the light emitting elements, as illustrated in FIG. 2, can include a pixel driving circuit PDC which includes a switching transistor Tsw1, a storage capacitor Cst, a driving transistor Tdr, and a sensing transistor Tsw2, and a light emitting element ED connected to the pixel driving circuit PDC.

A first terminal of the driving transistor Tdr can be connected to a first voltage supply line PLA through which a first voltage EVDD is supplied, and a second terminal of the driving transistor Tdr can be connected to the light emitting element ED.

A first terminal of the switching transistor Tsw1 can be connected to a data line DL, a second terminal of the switching transistor Tsw1 can be connected to a gate of the driving transistor Tdr, and a gate of the switching transistor Tsw1 can be connected to a gate line GL.

A data voltage Vdata can be supplied through the data line DL from the data driver 300. A gate signal GS can be supplied through the gate line GL from the gate driver 200. The gate signal GS can include a gate pulse GP for turning on the switching transistor Tsw1 and a gate-off signal for turning off the switching transistor Tsw1.

The sensing transistor Tsw2 can be provided for measuring a threshold voltage of the driving transistor Tdr or mobility of an electrical charge (for example, an electron), or supplying a reference voltage Vref to the pixel driving circuit PDC. A first terminal of the sensing transistor Tsw2 can be connected to the second terminal of the driving transistor Tdr and the light emitting element ED, a second terminal of the sensing transistor Tsw2 can be connected to a sensing line SL through which the reference voltage Vref is supplied, and a gate of the sensing transistor Tsw2 can be connected to a sensing control line SCL through which a sensing control signal SCS is supplied.

The sensing line SL can be connected to the data driver 300 and can be connected to the power supply unit 500 through the data driver 300. For example, the reference voltage Vref supplied from the power supply unit 500 can be supplied to the pixels through the sensing line SL, sensing signals transmitted from the pixels P can be converted into digital sensing signals in the data driver 300, and the digital sensing signals can be transmitted to the control driver 400.

The light emitting element ED can include a first electrode supplied with a first voltage EVDD through the driving transistor Tdr, a second electrode connected to a second voltage supply line PLB through which a second voltage is supplied, and a light emitting layer provided between the first electrode and the second electrode. The first electrode can be an anode and the second electrode can be a cathode.

The structure of the pixel P applied to a display device according to an embodiment of the present disclosure is not limited to the structure illustrated in FIG. 2. Accordingly, the structure of the pixel P can be changed to various shapes.

The touch panel 100b performs a function of sensing a touch, and for this purpose, can include touch electrodes.

For example, when the touch panel 100b uses a mutual-capacitance method, the touch electrodes can include touch driving electrodes and touch receiving electrodes. In this case, the touch driver 800 can supply a touch driving signal to the touch driving electrode and can determine whether a touch occurs by using a touch sensing signal generated by the touch driving signal and received from the touch receiving electrode.

In this case, the touch driving electrode provided on the touch panel 100b can be connected to the touch driver 800 through a touch driving electrode line TXL, and the touch receiving electrode provided on the touch panel 100b can be connected to the touch driver 800 through a touch receiving electrode line RXL.

The control driver 400 can realign input image data Ri, Gi, and Bi transmitted from an external system 600 by using a timing synchronization signal TSS transmitted from the external system and can generate a data control signal DCS which is to be supplied to the data driver 300 and a gate control signal GCS which is to be supplied to the gate driver 200.

To this end, as illustrated in FIG. 3, the control driver 400 can include a data aligner 430 (e.g., a circuit) which realigns input image data Ri, Gi, and Bi to generate image data Data, a control signal generator 420 (e.g., a circuit) which generates the gate control signal GCS and the data control signal DCS by using the timing synchronization signal TSS, an input unit 410 (e.g., a circuit) which transmits the timing synchronization signal TSS transmitted from the external system 600 to the control signal generator 420 and transmits the input image data Ri, Gi, and Bi transmitted from the external system 600 to the data aligner 430, and an output unit 440 (e.g., a circuit) which supplies the data driver 300 with the image data Data generated by the data aligner 430 and the data control signal DCS generated by the control signal generator 420 and supplies the gate driver 200 with the gate control signal GCS generated by the control signal generator 420.

The control signal generator 420 can generate a power control signal supplied to the power supply unit 500.

The control signal generator 420 can generate a touch control signal TCS supplied to the touch driver 800.

The control driver 400 can further include a storage unit for storing various information. The storage unit 450 can be included in the control driver 400 as illustrated in FIG. 3, but can be separated from the control driver 400 and provided independently.

The external system 600 can perform a function of driving the control driver 400 and an electronic device.

For example, when the electronic device is a smart phone, the external system 600 can receive various kinds of sound information and image information over a communication network and can transmit the received image information to the control driver 400.

For example, the external system 600 can convert the image information into input image data Ri, Gi, and Bi and transmit the input image data Ri, Gi, and Bi to the control driver 400.

The power supply unit 500 can generate various powers and supply the generated powers to the control driver 400, the gate driver 200, the data driver 300, the touch driver 800, and the image panel 100a.

The gate driver 200 can be directly embedded into the non-display area NDA by using a gate-in panel (GIP) type, or the gate driver 200 can be provided in the display area DA in which light emitting elements ED are provided, or the gate driver 200 can be provided on a chip on film mounted in the non-display area NDA.

The gate driver 200 can supply gate pulses GP1 to GPg to the gate lines GL1 to GLg.

When a gate pulse GP generated by the gate driver 200 is supplied to a gate of the switching transistor Tsw1 included in the pixel P, the switching transistor Tsw1 can be turned on. When the switching transistor Tsw1 is turned on, data voltage Vdata supplied through a data line DL can be supplied to the pixel P.

When a gate-off signal generated by the gate driver 200 is supplied to the switching transistor Tsw1, the switching transistor Tsw1 can be turned off. When the switching transistor Tsw1 is turned off, a data voltage cannot be supplied to the pixel P any longer.

The gate signal GS supplied to the gate line GL can include the gate pulse GP and the gate-off signal.

To supply gate pulses GP1 to GPg to gate lines GL1 to GLg, the gate driver 200, as illustrated in FIG. 4, can include stages ST1 to STg connected to gate lines GL1 to GLg.

Each of the stages ST1 to STg can be connected to one gate line GL, but can be connected to at least two gate lines GL.

In order to generate gate pulses GP1 to GPg, a gate start signal VST and at least one gate clock GCLK which are generated by the control signal generator 420 can be transferred to the gate driver 200. For example, the gate start signal VST and the at least one gate clock GCLK can be included in the gate control signal GCS.

One of the stages ST1 to STg can be driven by a gate start signal VST to output a gate pulse GP to a gate line GL. The gate pulse GP can be generated by a gate clock GCLK.

At least one of signals output from a stage ST where a gate pulse is output can be supplied to another stage ST to drive another stage ST. Accordingly, a gate pulse can be output in another stage ST.

For example, the stages ST can be driven sequentially to sequentially supply the gate pulses GP to the gate lines GL.

The data driver 300 can supply data voltages Vdata to the data lines DL1 to DLd.

To this end, the data driver 300, as illustrated in FIG. 5, can include a shift register 310 which outputs a sampling signal, a latch 320 which latches image data Data received from the control driver 400, a digital-to-analog converter 330 which converts the image data Data, transmitted from the latch 320, into a data voltage Vdata and outputs the data voltage Vdata, and an output buffer 340 which outputs the data voltage, transmitted from the digital-to-analog converter 330, to the data line DL on the basis of a source output enable signal SOE.

The shift register 310 can output the sampling signal by using the data control signal DCS received from the control signal generator 420. For example, the data control signals DCS transmitted to the shift register 310 can include a source start pulse SSP and a source shift clock signal SSC.

The latch 320 can latch image data Data sequentially received from the control driver 400, and then output the image data Data to the digital-to-analog converter 330 at the same time on the basis of the sampling signal.

The digital-to-analog converter 330 can convert the image data Data transmitted from the latch 320 into data voltages Vdata and output the data voltages Vdata.

The output buffer 340 can simultaneously output the data voltages Vdata transmitted from the digital-to-analog converter 330 to data lines DL1 to DLd of the display panel 100 on the basis of the source output enable signal SOE transmitted from the control signal generator 420.

To this end, the output buffer 340 can include a buffer 341 which stores the data voltage Vdata transmitted from the digital-to-analog converter 330 and a switch 342 which outputs the data voltage Vdata stored in the buffer 341 to the data line DL on the basis of the source output enable signal SOE.

For example, when the switches 342 are turned on based on the source output enable signal SOE simultaneously supplied to the switches 342, the data voltages Vdata stored in the buffers 341 can be supplied to the data lines DL1 to DLd through the switches 342.

The data voltages Vdata supplied to the data lines DL1 to DLd can be supplied to pixels P connected to a gate line GL supplied with a gate pulse GP.

Finally, the touch driver 800 can supply the touch driving signal to the touch panel 100b and can determine whether a touch occurs by using the touch sensing signal received from the touch panel 100b.

To this end, the touch driver 800 includes a touch driving unit 810 for sequentially transmitting a touch driving signal to the touch driving electrodes provided on the touch panel 100b and a touch determining unit 820 for determining whether a touch occurs by using touch sensing signals received from the touch receiving electrodes.

Figure 6:
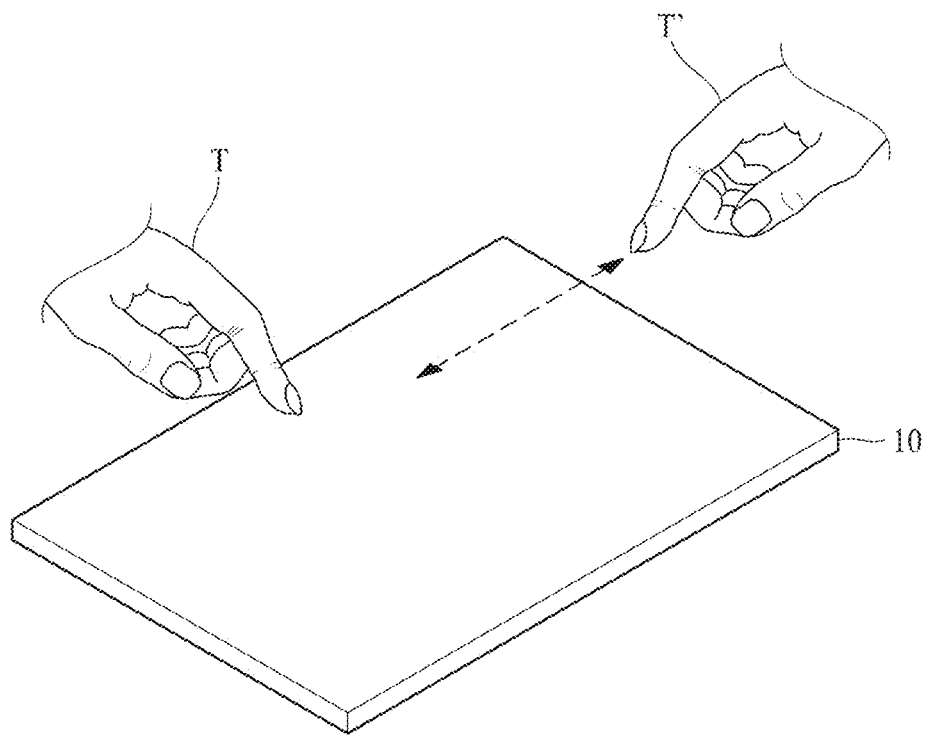
FIG. 6 is an exemplary diagram illustrating a method of using a display device according to an embodiment of the present disclosure.
Figure 7:
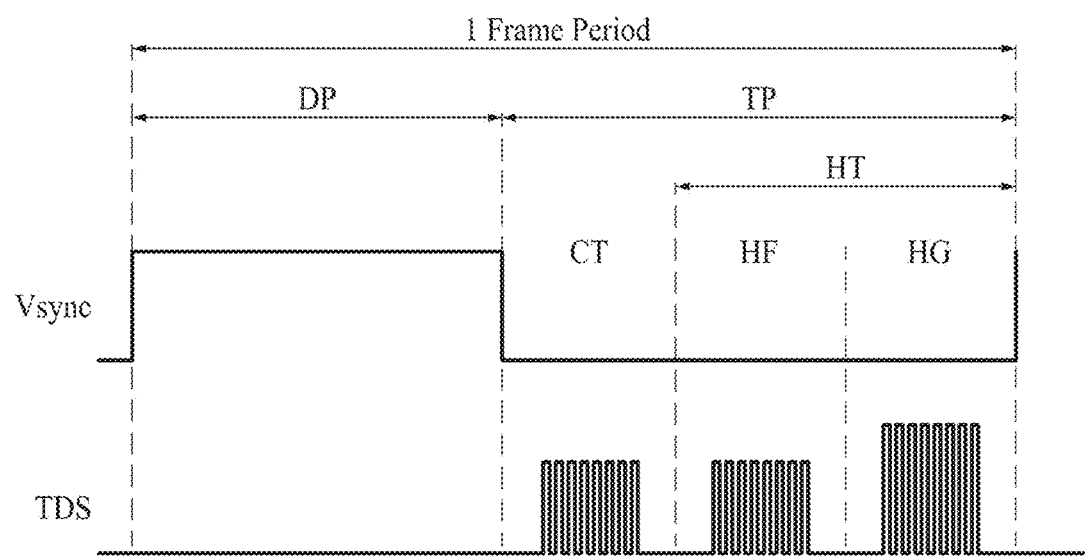
FIG. 7 is an exemplary diagram illustrating a touch timing of a display device according to an embodiment of the present disclosure.
Figure 8:
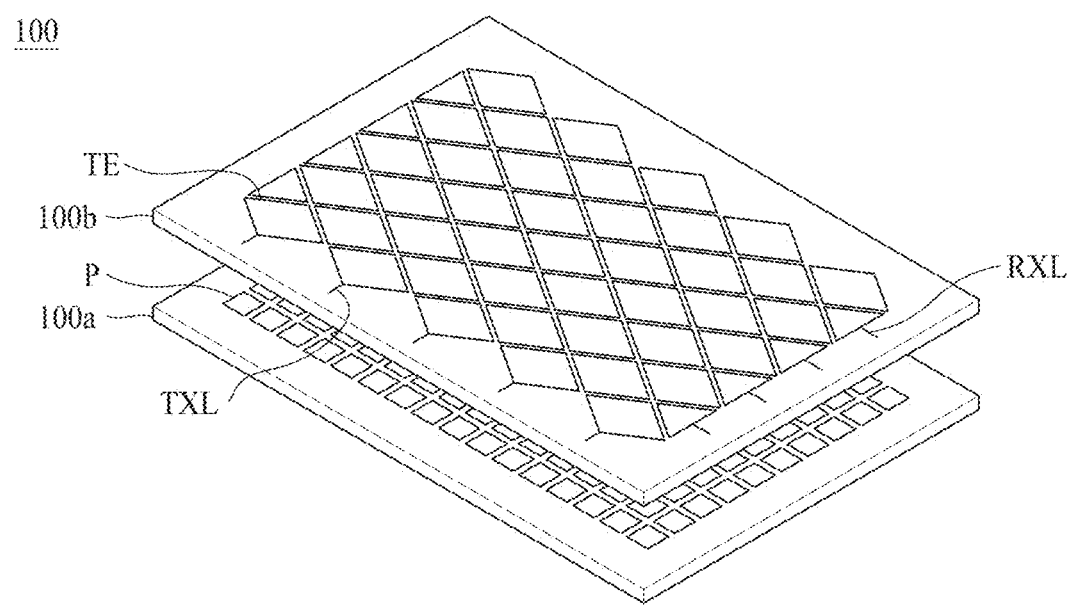
FIG. 8 is an exemplary diagram illustrating a structure of a display panel applied to a display device according to an embodiment of the present disclosure.
Figure 9:
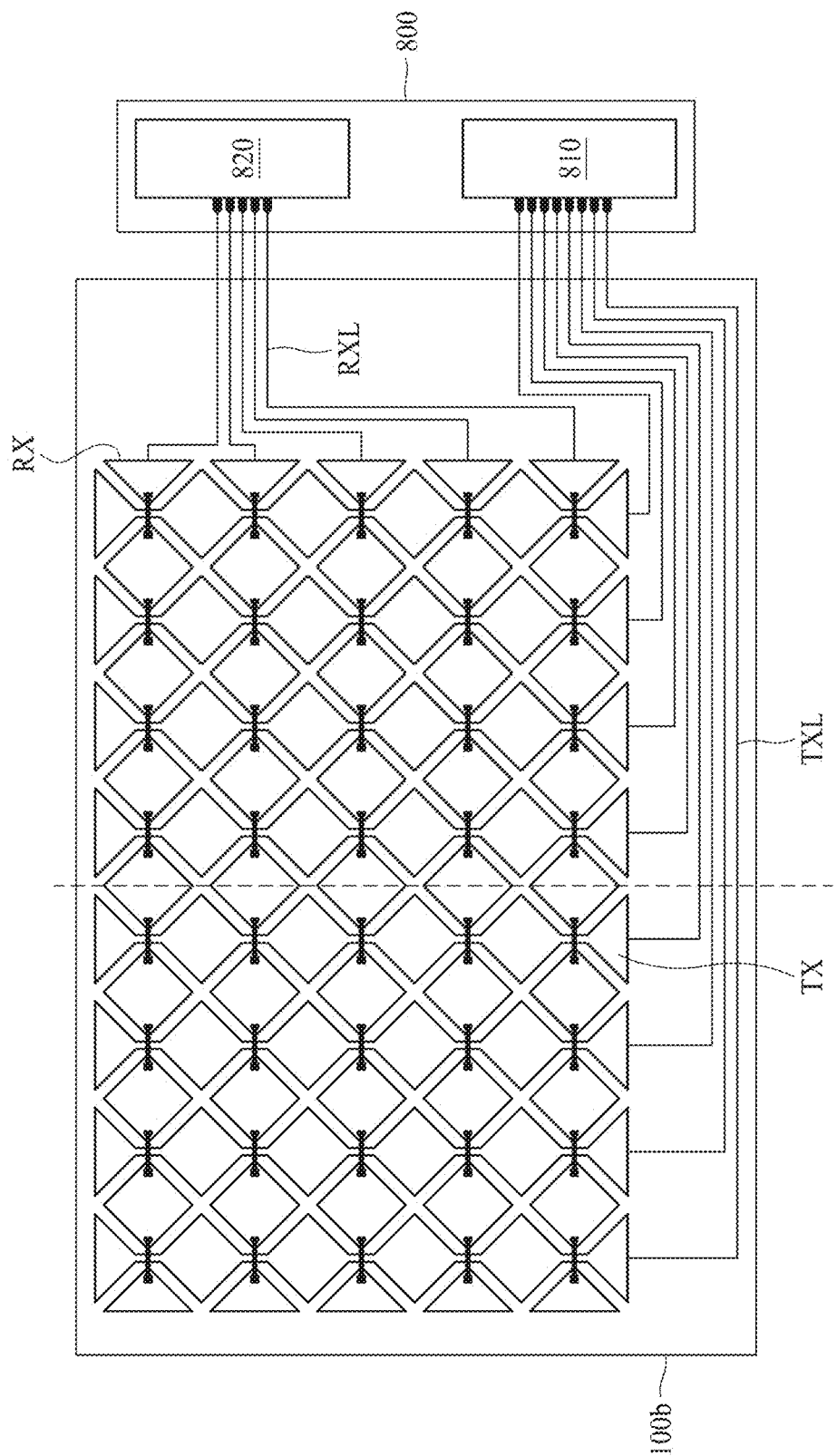
FIG. 9 is an exemplary diagram illustrating a structure of a touch panel applied to a display device according to an embodiment of the present disclosure.

FIG. 6 is an exemplary diagram illustrating a method of using a display device according to an embodiment of the present disclosure, FIG. 7 is an exemplary diagram illustrating a touch timing of a display device according to an embodiment of the present disclosure, FIG. 8 is an exemplary diagram illustrating a structure of a display panel applied to a display device according to an embodiment of the present disclosure, and FIG. 9 is an exemplary diagram illustrating a structure of a touch panel applied to a display device according to an embodiment of the present disclosure.

First, referring to FIGS. 6 and 7, a display device 10 according to an embodiment of the present disclosure may sense a touch T (hereinafter, simply referred to as a contact touch) by a finger of a user in contact with a touch panel 100b. Also, the display device 10 according to an embodiment of the present disclosure may sense a touch T' (hereinafter, simply referred to as a hover touch) by an action capable of changing capacitance generated in the touch panel 100b, although a finger is not in direct contact with the touch panel 100b. That is, the hover touch may refer to a touch caused by a non-contact.

For example, the hover touch may be a hover finger touch HF and a hover gesture touch.

The hover finger touch may refer to a touch by a finger moving above the upper surface of the touch panel 100b without directly contacting the touch panel 100b.

The hover gesture touch may refer to a touch by a gesture of palm or edge of a hand moving above the upper surface of the touch panel 100b.

That is, the display device 10 according to an embodiment of the present disclosure may sequentially sense the contact touch, the hover finger touch, and the hover gesture touch.

For example, in the display device 10 according to an embodiment of the present disclosure, as shown in FIG. 7, 1 frame period may be divided into a display period DP in which an image is displayed and a touch period TP in which a touch is sensed.

The display period DP and the touch period TP may be divided by a vertical synchronization signal Vsync.

The touch period TP may be divided into a contact touch sensing mode CT for sensing the contact touch, a hover finger sensing mode HF for sensing the hover finger touch, and a hover gesture sensing mode HG for sensing the hover gesture touch.

In the following description, when the hover finger sensing mode HF and the hover gesture sensing mode HG do not need to be distinguished, the hover finger sensing mode HF and the hover gesture sensing mode HG may be described as a hover touch sensing mode HT.

For example, the contact touch sensing mode CT, the hover finger sensing mode HF, and the hover gesture sensing mode HG may be distinguished from each other by a touch control signal TCS transmitted to a touch driver 800 from a control driver 400.

As shown in FIG. 7, in the contact touch sensing mode CT and the hover finger sensing mode HF, touch driving signals TDS having the same size may be sequentially supplied to touch driving electrodes from the touch driver 800.

However, in the hover gesture sensing mode HG, for example, a change amount of capacitance caused by edge of a hand of a user, which does not contact the touch panel 100*b*, should be sensed. Therefore, the sensitivity in the hover gesture sensing mode HG may be smaller than the sensitivity in the contact touch sensing mode CT and the hover finger sensing mode HF.

Accordingly, as shown in FIG. 7, the touch driving signal TDS used in the hover gesture sensing mode HG may be greater than the touch driving signal TDS used in the contact touch sensing mode CT and the hover finger sensing mode HF.

However, since the touch sensitivity in the hover finger sensing mode HF may be smaller than the touch sensitivity in the contact touch sensing mode CT, the magnitude of the touch driving signal TDS used in the hover finger sensing mode HF may be greater than the magnitude of the touch driving signal TDS used in the contact touch sensing mode CT and may be the same as the magnitude of the touch driving signal TDS used in the hover gesture sensing mode HG.

Also, as described above, the touch sensitivity is small in the hover finger sensing mode HF and the hover gesture sensing mode HG using a non-contact method. Thus, the display device according to an embodiment of the present disclosure may use a method of grouping at least two touch receiving electrodes adjacent to each other into a group in the hover finger sensing mode HF and the hover gesture sensing mode HG.

In this case, the method of grouping at least two touch receiving electrodes into a group may be used only in the hover gesture sensing mode HG. However, the method of grouping at least two touch receiving electrodes into a group may be used in both the hover finger sensing mode HF and the hover gesture sensing mode HG.

Hereinafter, the display device in which the method of grouping at least two touch receiving electrodes into a group is used in both the hover finger sensing mode HF and the hover gesture sensing mode HG is described as an example of display device according to an embodiment of the present disclosure.

In this case, the hover finger sensing mode HF and the hover gesture sensing mode HG may be collectively referred to as the hover touch sensing mode HT.

Then, as described above, a display panel 100 may include an image panel 100*a* on which an image is displayed and the touch panel 100*b* provided with touch electrodes TE for touch sensing.

The image panel 100*a* may include pixels P, a plurality of data lines DL1 to DLd, and a plurality of gate lines GL1 to GLg. Each of the pixels P may include a light emitting element ED and a pixel driving circuit PDC. As light is output from the light emitting elements ED, an image may be displayed on the image panel 100*a*.

The touch panel 100*b* may include the touch electrodes TE. The touch electrodes TE may include the touch driving electrodes and the touch receiving electrodes. That is, the touch panel 100*b* may include the touch driving electrodes and the touch receiving electrodes.

The touch driving electrodes may be connected to the touch driver 800 by touch driving electrode lines TXL, and the touch receiving electrodes may be connected to the touch driver 800 by touch receiving electrode lines RXL.

The touch panel 100*b* and the image panel 100*a* may be independently manufactured and then attached to each other by an adhesive.

However, the touch panel 100*b* may be directly provided on an upper surface of an encapsulation layer of the image panel 100*a*.

Finally, the touch panel 100*b* may include the touch electrodes TE for touch sensing, and the touch electrodes TE may be the touch driving electrodes TX and the touch receiving electrodes RX, as shown in FIG. 9.

That is, as shown in FIG. 9, the touch panel 100*b* may include the touch driving electrodes TX provided in a first direction of the touch panel 100*b* and the touch receiving electrodes RX provided in a second direction which is different from the first direction.

Herein, the first direction may be a direction parallel to the gate line GL provided in the image panel 100*a*, but not limited thereto.

Each of the touch driving electrodes TX may be connected to the touch driver 800 through the touch driving electrode line TXL, and each of the touch receiving electrodes RX may be connected to the touch driver 800 through the touch receiving electrode line RXL.

The touch driving electrodes TX and the touch receiving electrodes RX may be provided on the touch panel 100*b* in various structures.

The touch driver 800 includes a touch driving unit 810 (e.g., a circuit) for sequentially transmitting the touch driving signal TDS to the touch driving electrodes TX and a touch determining unit 820 (e.g., a circuit) for determining whether a touch occurs by the use of touch sensing signals received in the touch receiving electrodes RX.

The touch driving unit 810 may distinguish the contact touch sensing mode CT and the hover touch sensing mode HT from each other according to the touch control signal TCS transmitted from the control driver 400.

The touch driving unit 810 may supply the touch driving signal TDS having a level greater than that of the touch driving signal TDS used in the contact touch sensing mode CT to the touch driving electrodes TX.

The touch determining unit 820 may determine whether a touch occurs by using a differential method.

For example, the touch determining unit 820 may determine whether the touch panel 100*b* is touched by comparing the touch sensing signals transmitted from the two touch receiving electrodes RX adjacent to each other.

In order to increase the touch sensitivity in the hover touch sensing mode HT, the touch determining unit 820 may group the touch receiving electrode lines RXL connected to the at least two touch receiving electrodes RX adjacent to each other in a group, and then determine whether a touch occurs.

Hereinafter, details of this will be described with reference to FIGS. 10 to 15.

Figure 10:
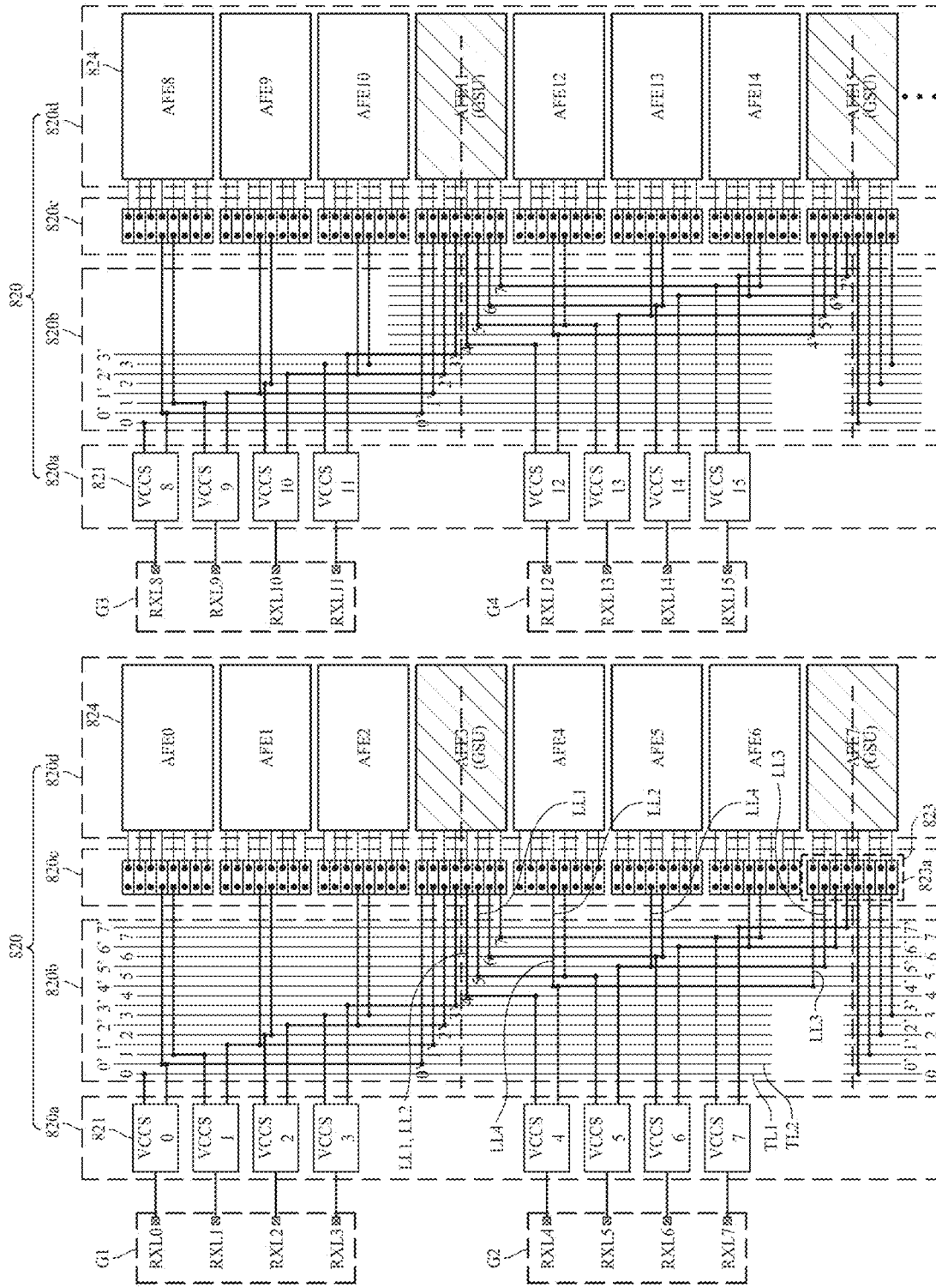
FIG. 10 is an exemplary diagram illustrating a structure of the touch determining unit applied to the display device according to an embodiment of the present disclosure.
Figure 11:
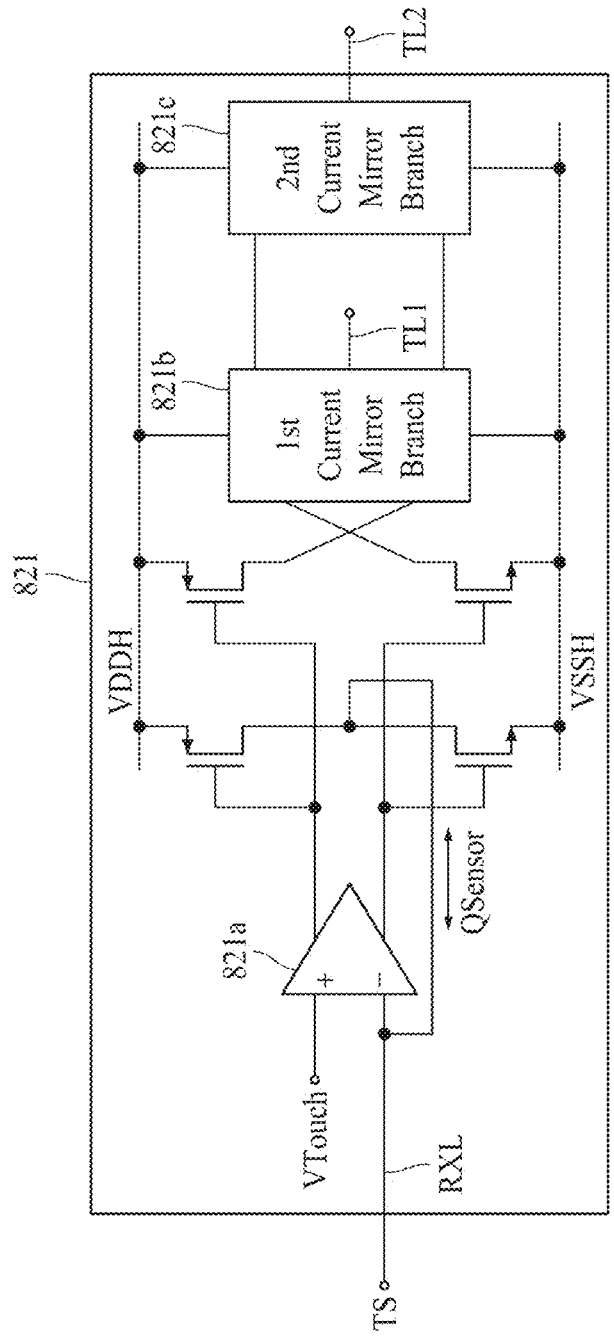
FIG. 11 is an exemplary diagram illustrating an internal structure of a current generating portion shown in FIG. 10 according to an embodiment of the present disclosure.
Figure 12:
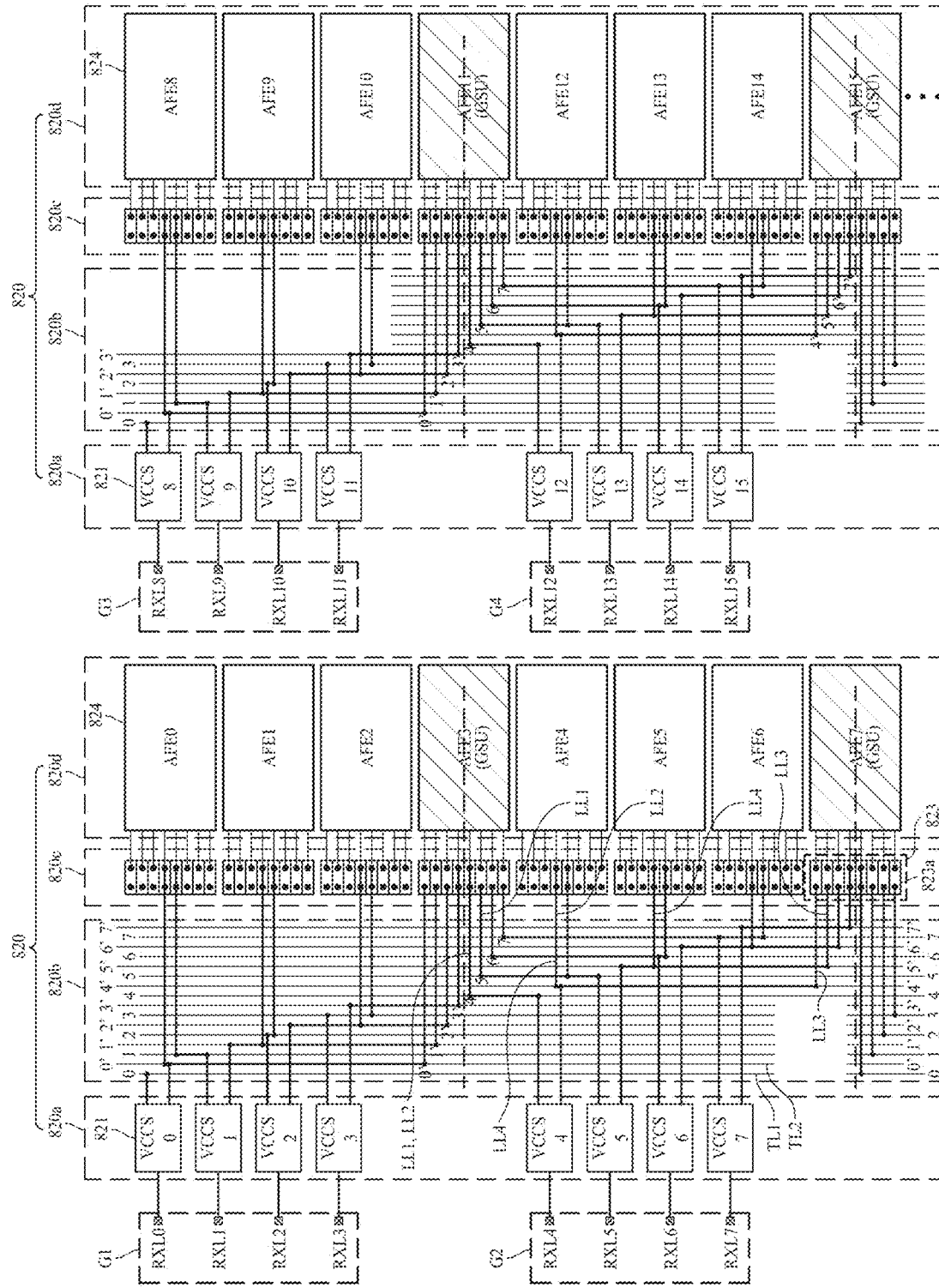
FIG. 12 is an exemplary diagram illustrating a connection structure of the touch determining unit shown in FIG. 10 in the contact touch sensing mode according to an embodiment of the present disclosure.
Figure 13:
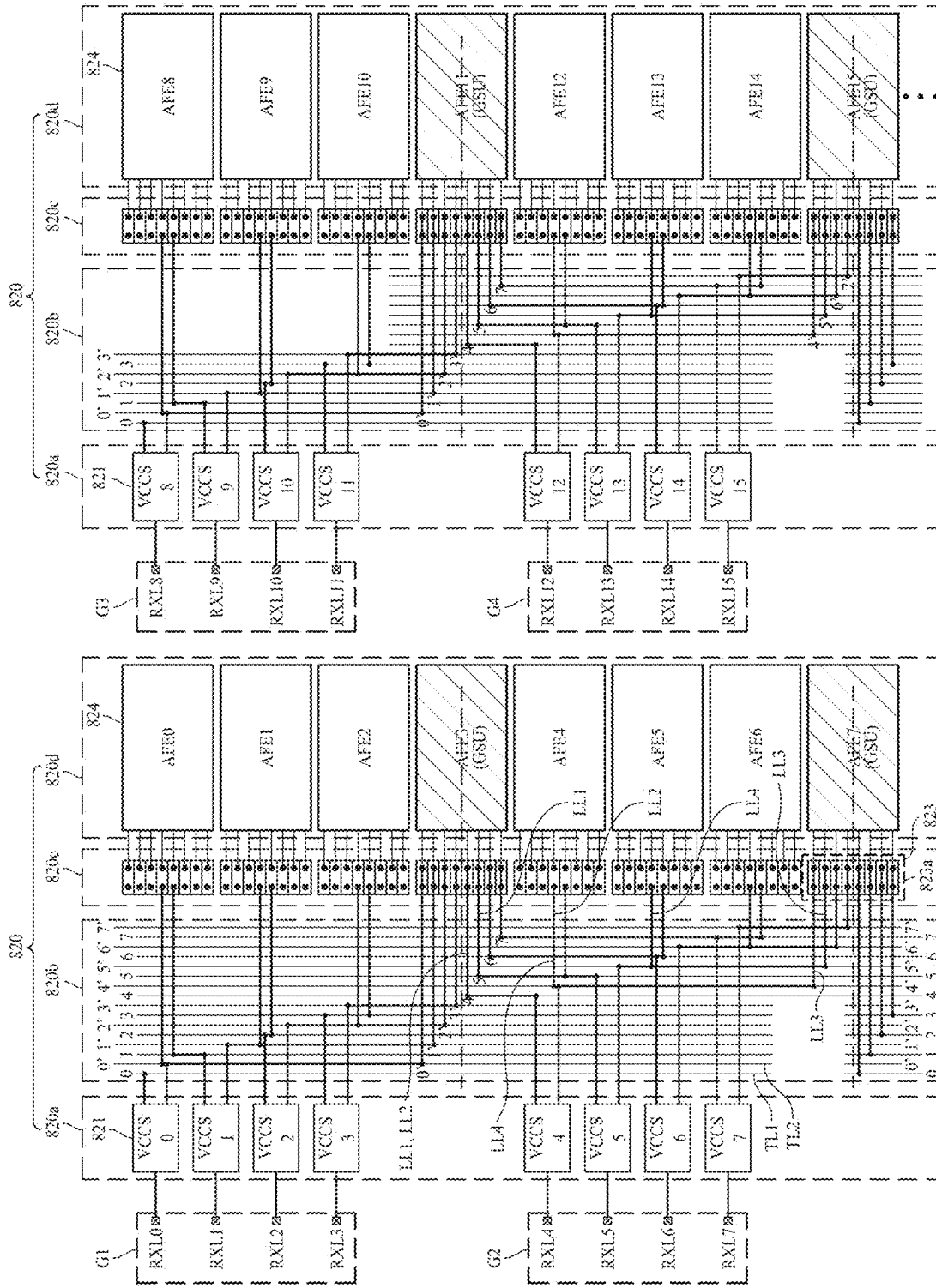
FIG. 13 is an exemplary diagram illustrating a connection structure of the touch determining unit shown in FIG. 10 in the hover touch sensing mode according to an embodiment of the present disclosure.

FIG. 10 is an exemplary diagram illustrating a structure of the touch determining unit applied to the display device according to an embodiment of the present disclosure, FIG. 11 is an exemplary diagram illustrating an internal structure of a current generating portion shown in FIG. 10 according to an embodiment of the present disclosure, FIG. 12 is an exemplary diagram illustrating a connection structure of the touch determining unit shown in FIG. 10 in the contact touch sensing mode according to an embodiment of the present disclosure, and FIG. 13 is an exemplary diagram illustrating a connection structure of the touch determining unit shown in FIG. 10 in the hover touch sensing mode according to an embodiment of the present disclosure. Particularly, due to the limitations of drawing, in FIG. 10, a third group G3 and a fourth group G4 are illustrated in parallel with a first group G1 and a second group G2, however, the first group G1 to the fourth group G4 can be arranged in a line along a vertical direction of FIG. 10 on the touch panel 100b.

As described above, the display device according to an embodiment of the present disclosure may include the image panel 100a including the pixels P, the touch panel 100b including the touch driving electrodes TX and the touch receiving electrodes RX provided on the image panel 100a, and the touch driver 800 for sensing a touch on the touch panel 100b.

First, the touch determining unit 820 of the touch driver 800 may determine whether the touch panel 100b is touched by using a first copy touch sensing signal and a second copy touch sensing signal corresponding to the touch sensing signal transmitted from the touch receiving electrode line RXL connected to the touch receiving electrode RX.

In particular, a sensing portion 824 of the touch determining unit 820 may use the differential method for determining whether the touch panel 100b is touched by comparing the touch sensing signals transmitted from the two adjacent touch receiving electrodes RX.

In order to use the differential method, the touch sensing signal transmitted from the touch receiving electrode line RXL may be transmitted to the two different sensing portions.

In the related art, a method of dividing the touch sensing signal transmitted from the touch receiving electrode line RXL into two lines and transmitting the divided signals to the two sensing portions is used.

However, according to the related art method, a signal corresponding to the half of the magnitude of the touch sensing signal received from the touch receiving electrode line RXL is supplied to each of the two sensing portions.

Accordingly, the sensing portion determines whether a touch occurs by using the signal having a size smaller than that of the touch sensing signal so that it is difficult to normally determine whether a touch occurs.

In order to solve such a problem, the display device according to an embodiment of the present disclosure copies the touch sensing signal transmitted from the touch receiving electrode line RXL, generates the first copy touch sensing signal and the second copy touch sensing signal corresponding to the touch sensing signal, and transmits the first copy touch sensing signal and the second copy touch sensing signal to the different sensing portions.

Accordingly, the sensing portion may determine whether a touch occurs by using the first copy touch sensing signal or the second copy touch sensing signal having the same size as the touch sensing signal transmitted from the touch receiving electrode line RXL.

Accordingly, it is possible to determine whether an accurate touch occurs.

This copy function may be performed in a mirror portion 820a of the touch determining unit 820. In particular, the copy function may be performed in a current generating portion 821 of the mirror portion 820a.

Then, the touch driver 800 may determine whether a normal touch occurs by using the touch sensing signals received from the two touch receiving electrode lines RXL adjacent to each other in the contact touch sensing mode CT.

Also, the touch driver 800 may determine whether a group touch occurs by using the touch sensing signals received from the touch receiving electrode lines RXL of $2*2^n$ ('n' is a natural number and '$2^n$' is the number of touch receiving electrode lines grouped together) being adjacent to each other in the hover touch sensing mode HT.

For example, the touch determining unit 820 using the differential method may determine whether a normal touch occurs by using the touch sensing signals received from the two touch receiving electrode lines RXL adjacent to each other in the contact touch sensing mode CT.

In this case, as described above, the current generating portion 821 connected to the touch receiving electrode line RXL may generate the first copy touch sensing signal and the second copy touch sensing signal by using the touch sensing signal received from the touch receiving electrode line RXL and may transmit the first copy touch sensing signal and the second copy touch sensing signal to the different sensing portions.

That is, the sensing portion 824 may receive the first copy touch sensing signal or the second copy touch sensing signal from any one of the two touch receiving electrode lines RXL adjacent to each other and may receive the first copy touch sensing signal or the second copy touch sensing signal from another touch receiving electrode line RXL.

Accordingly, the two signals received by the sensing portion 824 may correspond to the touch sensing signals received from the two touch receiving electrode lines RXL adjacent to each other.

The sensing portion 824 may determine whether a touch occurs by using the two signals corresponding to the touch sensing signals received from the two touch receiving electrode lines RXL. Therefore, it is possible to accurately determine whether a touch occurs in the two touch receiving electrodes RX connected to the two touch receiving electrode lines RXL.

Also, the touch determining unit 820 using the differential method may determine whether a group touch occurs by using the touch sensing signals received from the touch receiving electrode lines RXL of $2*2^n$ adjacent to each other in the hover touch sensing mode HT.

Herein, 'n' is a natural number, '$2^n$' is the number of touch receiving electrode lines RXL included in the group, and '$2*2^n$' is the number of touch receiving electrode lines RXL connected to the sensing portion 824 in the hover touch sensing mode HT.

For example, as shown in FIG. 10, when the four touch receiving electrode lines RXL are grouped into one group, 'n' may be 2.

When the four touch receiving electrode lines RXL are grouped into one group, the zeroth touch receiving electrode line RXL0 to the third touch receiving electrode line RXL3 may be included in the first group G1, the fourth touch receiving electrode line RXL4 to the seventh touch receiving electrode line RXL7 may be included in the second group G2, the eighth touch receiving electrode line RXL8 to the eleventh touch receiving electrode line RXL11 may be included in the third group G3, and the twelfth touch receiving electrode line RXL12 to the fifteenth touch receiving electrode line RXL15 may be included in the fourth group G4.

In this case, in the hover touch sensing mode HT, each of the sensing portions 824 may determine whether a group touch occurs by using the touch sensing signals received from the touch receiving electrode lines RXL of $2*2^n$ adjacent to each other.

In the following description, when it is required to distinguish the sensing portions 824 from each other and to provide the order of the sensing portions 824, each of the sensing portions 824 may be indicated by a reference numeral AFE instead of a reference numeral 824. That is, the zeroth sensing portion may be denoted by a reference numeral AFE0, the first sensing portion may be denoted by a reference numeral AFE1, and the second sensing portion may be denoted by a reference numeral AFE2.

For example, in the hover touch sensing mode HT, the third sensing portion AFE3 may determine whether a touch occurs by using the touch sensing signals received from the zeroth touch receiving electrode line RXL0 to the seventh touch receiving electrode line RXL7, and the seventh sensing portion AFE7 may determine whether a touch occurs by using the touch sensing signals received from the fourth touch receiving electrode line RXL4 to the eleventh touch receiving electrode line RXL11, and the eleventh sensing portion AFE11 may determine whether a touch occurs by using the touch sensing signals received from the eighth touch receiving electrode line RXL8 to the fifteenth touch receiving electrode line RXL15.

Next, in order to perform the above-described functions, the touch driver 800, and more particularly, the touch determining unit 820, as shown in FIG. 10, may include the mirror portion 820a connected with the touch receiving electrode lines RXL, the mode switching portion 820c including switching portions 823 connected with the mirror portion 820a, and a signal processing portion 820d including the sensing portions 824 connected with the switching portions 823. In this case, the mirror portion 820a and the switching portion 820c may be connected to each other through a routing portion 820b.

First, the mirror portion 820a includes the current generating portions 821 connected to the touch receiving electrode lines RXL.

Each of the current generating portions 821 may generate the first copy touch sensing signal and the second copy touch sensing signal corresponding to the touch sensing signal by using the touch sensing signal TS transmitted from the touch receiving electrode line RXL.

To this end, as shown in FIG. 11, the current generating portion 821 may include a receiver 821a configured to receive the touch sensing signal TS from the touch receiving electrode line RXL, a first current mirror branch 821b configured to generate the first copy touch sensing signal by using the touch sensing signal TS received through the receiver 821a, and a second current mirror branch 821c configured to generate the second copy touch sensing signal by using the touch sensing signal TS received through the receiver 821a.

That is, the current generating portion 821 may generate the first copy touch sensing signal and the second copy touch sensing signal having the same or similar characteristics as the touch sensing signal TS by using the two current mirror branches 821a and 821b.

A reference signal VTouch may further be input to the receiver 821a.

In the following description, when it is required to distinguish the current generating portions 821 from each other and to provide the order of the current generating portions 821, each of the current generating portions 821 may be indicated by a reference numeral VCC instead of a reference numeral 821.

That is, the zeroth current generating portion may be denoted by a reference numeral VCCS 0, the first current generating portion may be denoted by a reference numeral VCCS 1, and the second current generating portion may be denoted by a reference numeral VCCS 2.

Second, a routing portion 820b may be connected to the mirror portion 820a.

The routing portion 820b may include first transmission lines TL1 and second transmission lines TL2 which are connected to the current generating portions 821.

For example, each of the current generating portions 821 may output the first copy touch sensing signal and the second copy touch sensing signal corresponding to the touch sensing signal TS transmitted from the touch receiving electrode line RXL to the first transmission line TL1 and the second transmission line TL2.

To this end, the first current mirror branch 821b may be connected to the first transmission line TL1, and the second current mirror branch 821c may be connected to the second transmission line TL2.

That is, the current generating portions 821 may be connected to the first transmission line TL1 and the second transmission line TL2, respectively.

For example, in FIG. 10, the first transmission line TL1 and the second transmission line TL2 connected to the zeroth current generating portion VCCS 0 are denoted by 0 and 0', the first transmission line TL1 and the second transmission line TL2 connected to the first current generating portion VCCS 1 are denoted by 1 and 1', and the first transmission line TL1 and the second transmission line TL2 connected to the second current generating portion VCCS 2 are denoted by 2 and 2'.

Thus, as shown in FIG. 10, when the four touch receiving electrode lines RXL are included in the group, the routing portion 820b may include eight of the first transmission lines TL1 and eight of the second transmission lines TL2.

Third, a mode switching portion 820c includes the switching portions 823.

Each of the switching portions 823 may be connected to at least two current generating portions 821 through the routing portion 820b and may be connected to the same number of current generating portions 821 in order to reduce the characteristic deviation between the switching portions 823. For example, each of the switching portions 823 may be connected to the '2*2'' current generating portions 821.

In addition, when 'n' is 2, as shown in FIG. 10, each of the switching portions 823 may be connected to the eight current generating portions 821 through eight switches 823a.

Fourth, the signal processing portion 820d includes the sensing portions 824 connected to the switching portions 823.

Each of the sensing portions 824 may determine whether a touch occurs by using the touch sensing signals TS received through at least two touch receiving electrode lines RXL adjacent to each other.

Herein, the touch sensing signal TS may be the first copy touch sensing signal or the second copy touch sensing signal. However, as described above, the first copy touch sensing signal and the second copy touch sensing signal are signals having the same or similar characteristics as the touch sensing signal TS. Therefore, hereinafter, if there is no need to distinguish the first copy touch sensing signal and the second copy touch sensing signal, the display device according to an embodiment of the present disclosure will be described using the touch sensing signal TS.

Also, as described above, in the following description, when it is required to distinguish the sensing portions 824 from each other and to provide the order of the sensing portions 824, each of the sensing portions 824 may be indicated by a reference numeral AFE instead of a reference numeral 824.

Each of the sensing portions 824 may be connected to the two touch receiving electrode lines RXL adjacent to each other through the switching portion 823 in the contact touch sensing mode CT so that it is possible to determine whether a contact touch occurs.

For example, in the contact touch sensing mode CT, the two switches 823*a* adjacent to each other among the eight switches 823*a* included in the switching portion 823 may be turned-on according to the touch control signal TCS transmitted from the control driver 400. Accordingly, the sensing portion 824 may be connected to only two touch receiving electrode lines RXL adjacent to each other. Accordingly, the sensing portion 824 may determine whether a touch occurs by using the touch sensing signals TS received from the two touch receiving electrodes RX adjacent to each other.

Then, the first transmission line TL1 may be connected to at least one switching portion 823, and the second transmission line TL2 may be connected to at least one switching portion 823.

For example, the first transmission line TL1 may be connected to a first routing line LL1 and a second routing line LL2, and the second transmission line TL2 may be connected to a third routing line LL3 and a fourth routing line LL4.

In this case, the first routing line LL1 may be connected to a group sensing portion GSU which determines whether a group touch occurs among the sensing portions 824 in the hover touch sensing mode HT, and the second routing line LL2 may be connected to a normal sensing portion which determines whether a normal touch occurs among the sensing portions 824 in the contact touch sensing mode CT.

Also, the third routing line LL3 may be connected to another group sensing portion GSU spaced apart from the group sensing portion GSU with '$2^n-1$' normal sensing portions therebetween, and the fourth routing line LL4 may be connected to another normal sensing portion adjacent to the normal sensing portion connected to the second routing line LL2.

For example, in FIG. 10, each of the third sensing portion AFE3, the seventh sensing portion AFE7, and the eleventh sensing portion AFE11 may be the group sensing portion GSU, and all of the sensing portions 824 shown in FIG. 10 may be the normal sensing portion.

Additionally, in the contact touch sensing mode CT, all the sensing portions 824 may be the normal sensing portions. In the hover touch sensing mode HT, some of the sensing portions 824, for example, the third sensing portion AFE3, the seventh sensing portion AFE7, and the eleventh sensing portion AFE11 may be the group sensing portions GSU.

That is, some of the sensing portions 824 may perform only the function of the normal sensing portion.

Also, some of the sensing portions 824, for example, the third sensing portion AFE3, the seventh sensing portion AFE7, and the eleventh sensing portion AFE11 may perform the function of the normal sensing portion in the contact touch sensing mode CT and may perform the function of the group sensing portion GSU in the hover touch sensing mode HT.

For example, in FIG. 10, the group sensing portion GSU connected to the first routing line LL1 connected to the fifth current generating portion VCCS 5 is the third sensing portion AFE3, and the normal sensing portion connected to the second routing line LL2 connected to the fifth current generating portion VCCS 5 is the fourth sensing portion AFE4.

In this case, the group sensing portion GSU connected to the first routing line LL1 connected to the fifth current generating portion VCCS 5 and the normal sensing portion connected to the second routing line LL2 connected to the fifth current generating portion VCCS 5 are the different sensing portions.

Also, in FIG. 10, the group sensing portion GSU connected to the third routing line LL3 connected to the fifth current generating portion VCCS 5 is the seventh sensing portion AFE7, and the normal sensing portion connected to the fourth routing line LL4 connected to the fifth current generating portion VCCS 5 is the fifth sensing portion AFE5.

Accordingly, the group sensing portion GSU connected to the third routing line LL3 connected to the fifth current generating portion VCCS 5 and the normal sensing portion connected to the fourth routing line LLA connected to the fifth current generating portion VCCS 5 are the different sensing portions.

In this case, the third routing line LL3 connected to the fifth current generating portion VCCS 5 may be connected to another group sensing portion GSU spaced apart from the group sensing portion connected to the first routing line LL1 with the '$2^n-1$' normal sensing portions interposed therebetween.

For example, when 'n' is 2, the three normal sensing portions may be provided between the group sensing portion GSU connected to the first routing line LL1 and the group sensing portion GSU connected to the third routing line LL3.

Additionally, in FIG. 10, the group sensing portion GSU connected to the third routing line LL3 connected to the fifth current generating portion VCCS 5 is the seventh sensing portion AFE7, and the group sensing portion GSU connected to the first routing line LL1 connected to the fifth current generating portion VCCS 5 is the third sensing portion AFE3. In this case, the three sensing portions AFE4, AFE5, and AFE6 are provided between the third sensing portion AFE3 and the seventh sensing portion AFE7, and the three sensing portions AFE4, AFE5, and AFE6 are the normal sensing portions driven only in the contact touch sensing mode CT.

In this case, the fourth routing line LL4 connected to the fifth current generating portion VCCS 5 may be connected to another normal sensing portion adjacent to the normal sensing portion connected to the second routing line LL2 connected to the fifth current generating portion VCCS 5.

For example, as shown in FIG. 10, the fourth routing line LLA connected to the fifth current generating portion VCCS 5 may be connected to the fifth sensing portion AFE5, and the second routing line LL2 connected to the fifth current generating portion VCCS 5 may be connected to the fourth sensing portion AFE4.

Next, in the example described above, the group sensing portion GSU connected to the first routing line LL1 and the normal sensing portion connected to the second routing line LL2 are the different sensing portions 824. However, the group sensing portion GSU connected to the first routing line LL1 and the normal sensing portion connected to the second routing line LL2 may be the same sensing portion 824.

For example, in FIG. 10, the group sensing portion GSU connected to the first routing line LL1 connected to the fourth current generating portion VCCS 4 is the third sensing portion AFE3, and the normal sensing portion connected to the second routing line LL2 connected to the fourth current generating portion VCCS 4 is also the third sensing portion AFE3.

That is, the group sensing portion GSU connected to the first routing line LL1 connected to the fourth current generating portion VCCS 4 and the normal sensing portion connected to the second routing line LL2 connected to the fourth current generating portion VCCS 4 may be the same sensing portion.

In this case, however, the group sensing portion GSU connected to the third routing line LL3 and the normal sensing portion connected to the fourth routing line LL4 may be the different sensing portions 824.

For example, in FIG. 10, the group sensing portion GSU connected to the third routing line LL3 connected to the fourth current generating portion VCCS 4 is the seventh sensing portion AFE7, and the normal sensing portion connected to the fourth routing line LLA connected to the fourth current generating portion VCCS 4 is the fourth sensing portion AFE4.

Accordingly, the group sensing portion GSU connected to the third routing line LL3 connected to the fourth current generating portion VCCS 4 and the normal sensing portion connected to the fourth routing line LL4 connected to the fourth current generating portion VCCS 4 may be the different sensing portions.

Then, in the above-described example, the group sensing portion GSU connected to the first routing line LL1 and the normal sensing portion connected to the second routing line LL2 are the same sensing portion 824, and the group sensing portion GSU connected to the third routing line LL3 and the normal sensing portion connected to the fourth routing line LL4 are the different sensing portions.

However, the group sensing portion GSU connected to the first routing line LL1 and the normal sensing portion connected to the second routing line LL2 may be the different sensing portions 824, and another group sensing portion GSU connected to the third routing line LL3 and another normal sensing portion connected to the fourth routing line LL4 may be the same sensing portion.

For example, in FIG. 10, the first routing line, the second routing line, the third routing line, and the fourth routing line connected to the seventh current generating portion VCCS 7 may have the above-described same structure.

Next, each of the current generating portions 821 may generate the first copy touch sensing signal and the second copy touch sensing signal corresponding to the touch sensing signal TS transmitted from the touch receiving electrode line RXL and may transmit the first copy touch sensing signal and the second copy touch sensing signal to the signal processing portion 820d.

For example, the fifth current generating portion VCCS 5 may transmit the first copy touch sensing signal to the third sensing portion AFE3 through the first routing line LL1 connected to the first transmission line TL1, transmit the first copy touch sensing signal to the fourth sensing portion AFE4 through the second routing line LL2 connected to the first transmission line TL1, transmit the second copy touch sensing signal to the seventh sensing portion AFE7 through the third routing line LL3 connected to the second transmission line TL2, and transmit the second copy touch sensing signal to the fifth sensing portion AFE5 through the fourth routing line LL4 connected to the second transmission line TL2.

Then, among the sensing portions 824, the ($2''$*m−1)th sensing portion ('m' is a natural number) may be connected to the two touch receiving electrode lines RXL adjacent to each other through the switching portion 823 in the contact touch sensing mode CT, and may be connected to the '$2*2'''$' touch receiving electrode lines RXL adjacent to each other through the switching portion 823 in the hover touch sensing mode HT.

For example, as shown in FIG. 12, when 'n' is 2, in the contact touch sensing mode CT, the third sensing portion AFE3 (when 'm' is 1) may be connected to the third touch receiving electrode line RXL3 and the fourth touch receiving electrode line RXL4 through the switching portion 823, and the seventh sensing portion AFE7 (when 'm' is 2) may be connected to the seventh touch receiving electrode line RXL7 and the eighth touch receiving electrode line RXL8 through the switching portion 823.

That is, each of the third sensing portion AFE3 and the seventh sensing portion AFE7 may determine whether a touch occurs by using the two touch receiving electrode lines RXL adjacent to each other in the contact touch sensing mode CT.

In addition, as shown in FIG. 13, when 'n' is 2, in the hover touch sensing mode HT, the third sensing portion AFE3 (when 'm' is 1) may be connected to the zeroth to seventh touch receiving electrode lines RXL0 to RXL7 through the switching portion 823, and the seventh sensing portion AFE7 (when 'm' is 2) may be connected to the fourth touch receiving electrode line RXL4 to the eleventh touch receiving electrode line RXL11 through the switching portion 823.

That is, in the hover touch sensing mode HT, each of the third sensing portion AFE3 and the seventh sensing portion AFE7 may determine whether a touch occurs by using the eight touch receiving electrode lines RXL adjacent to each other.

Accordingly, the touch sensitivity in the hover touch sensing mode HT may be improved.

Then, each of the switching portions 823 may include the two switches, and the switching portion 823 connected to the ($2''$*m−1)th sensing portion ('m' is a natural number) 824 among the switching portions 823 may include the '$2*2'''$' switches.

For example, as described above, the ($2''$*m−1)th sensing portion ('m' is a natural number) 824 is driven in both the contact touch sensing mode CT and the hover touch sensing mode HT, and the remaining sensing portions are driven only in the contact touch sensing mode CT.

In the contact touch sensing mode CT, each of the sensing portions 824 may determine whether a touch occurs by using the touch sensing signals TS received from the two touch receiving electrode lines RXL adjacent to each other, as described above.

Accordingly, each of the switching portions 823 connected to the sensing portion 824 is connected to the two switches 823a, and the two switches 823a are connected to the two touch receiving electrode lines RXL adjacent to each other.

However, the switching portion 823 connected to the ($2''$*m−1)th sensing portion ('m' is a natural number) used in the hover touch sensing mode HT may include the '$2*2'''$' switches. In this case, the '$2*2'''$' switches included in the switching portion 823 connected to the ($2''$*m−1)th sensing portion are connected to the '$2*2'''$' touch receiving electrode lines RXL adjacent to each other.

For example, when 'n' is 2, as shown in FIGS. 10 and 13, each of the third sensing portion AFE3, the seventh sensing portion AFE7, and the eleventh sensing portion AFE11 may be connected to the eight touch receiving electrode lines RXL adjacent to each other.

Accordingly, each of the switching portions 823 connected to the third sensing portion AFE3, the seventh sensing portion AFE7, and the eleventh sensing portion AFE11 may include the eight switches 823a.

In addition, each of the switching portions 823 may include the at least two switches 823a. In particular, the switching portion 823 connected to the (2"*m−1)th sensing portion may include the at least '2*2"' switches.

However, in order to reduce a characteristic deviation between the switching portions 823 and simplify a manufacture process of the switching portions 823, all the switching portions 823 may include the same number of switches 823a and each of the switching portions 823 may include the at least '2*2"' switches.

For example, as shown in FIG. 10, when 'n' is 2, the at least eight switches 823a may be provided to each in all of the switching portions 823.

Finally, as described above, the sensing portions 824 may include the normal sensing portions for determining whether a touch occurs by using the touch sensing signals TS received from the two touch receiving electrode lines RXL adjacent to each other in the contact touch sensing mode CT.

That is, all the sensing portions 824 included in the signal processing portion 820d may be the normal sensing portions in the contact touch sensing mode CT.

Among the sensing portions 824, the two sensing portions 824 spaced apart from each other with the '2"−1' sensing portions 824 interposed therebetween may be the group sensing portions GSU which determine whether a touch occurs by using the touch sensing signals TS received from the '2*2"' touch receiving electrode lines RXL adjacent to each other in the hover touch sensing mode HT.

That is, in the hover touch sensing mode HT, only the group sensing portions GSU among the sensing portions 824 may be driven to sense a hover touch. The '2"−1' sensing portions 824 may be provided between the group sensing portions GSU driven in the hover touch sensing mode HT.

Hereinafter, examples in which various numbers of the touch receiving electrode lines RXL are grouped into the group in the hover touch sensing mode HT may be described with reference to FIGS. 11 to 15.

Figure 14:
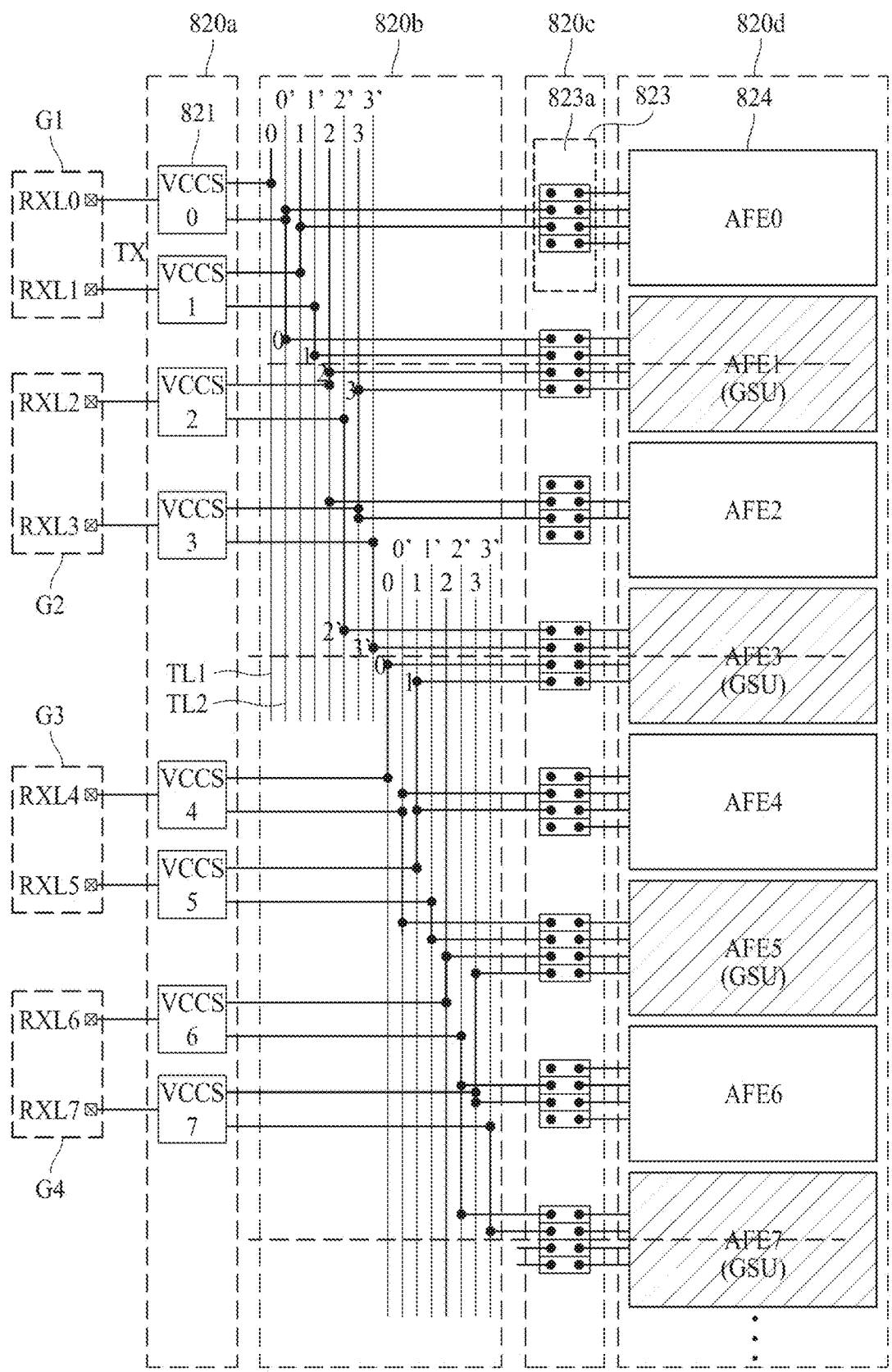
FIG. 14 and FIG. 15 are diagrams illustrating other examples of a structure of the touch determining unit applied to the display device according to an embodiment of the present disclosure.
Figure 15:
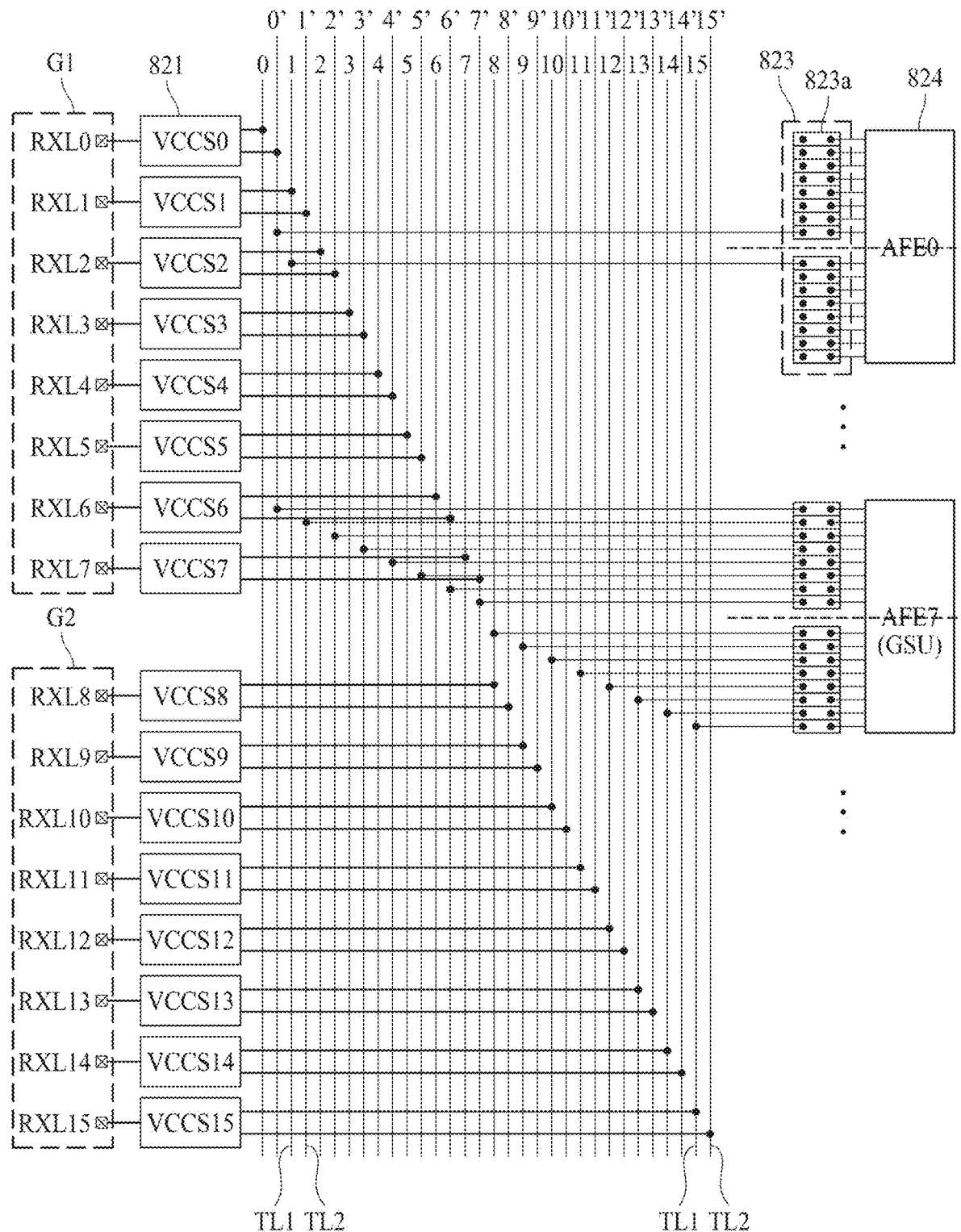

FIG. 14 and FIG. 15 are diagrams illustrating other examples of a structure of the touch determining unit applied to the display device according to an embodiment of the present disclosure. In particular, FIG. 14 is an exemplary diagram illustrating an example in which the two touch receiving electrode lines RXL are grouped into a group in the hover touch sensing mode HT, and FIG. 15 is an exemplary diagram illustrating an example in which the eight touch receiving electrode lines RXL are grouped into a group in the hover touch sensing mode HT.

In the following description, descriptions which are the same as or similar to those described with reference to FIGS. 1 to 13 will be omitted or briefly described.

As described above, the touch driver 800 may determine whether a group touch occurs by using the touch sensing signals TS received from the touch receiving electrode lines RXL of 2*2" ('n' is a natural number and '2"' is the number of the touch receiving electrode lines RXL grouped together) being adjacent to each other in the hover touch sensing mode HT.

First, the structure and function of the touch determining unit 820 when 'n' is 2 will be described with reference to FIGS. 10, 12, and 13.

When 'n' is 2, the touch determining unit 820 may group the four touch receiving electrode lines RXL adjacent to each other into a group in the hover touch sensing mode HT and may determine whether a group touch occurs by using the touch sensing signals TS received from the eight touch receiving electrode lines RXL adjacent to each other.

In this case, as shown in FIG. 10, the zeroth touch receiving electrode line RXL0 to the third touch receiving electrode line RXL3 may be included in the first group G1, the fourth touch receiving electrode line RXL4 to the seventh touch receiving electrode line RXL7 may be included in the second group G2, the eighth touch receiving electrode line RXL8 to the eleventh touch receiving electrode line RXL11 may be included in the third group G3, and the twelfth touch receiving electrode line RXL12 to the fifteenth touch receiving electrode line RXL15 may be included in the fourth group G4.

Each of the touch receiving electrode lines RXL may be connected to the current generating portions 821.

Each of the current generating portions 821 may be connected to the first transmission line TL1 and the second transmission line TL2.

In the following description, as shown in FIG. 10, the first transmission line TL1 and the second transmission line TL2 connected to the zeroth current generating portion VCCS 0 may be denoted by reference numerals 0 and 0', the first transmission line TL1 and the second transmission line TL2 connected to the first current generating portion VCCS 1 may be denoted by reference numerals 1 and 1', and the first transmission line TL1 and the second transmission line TL2 connected to the seventh current generating portion VCCS 7 may be denoted by reference numerals 7 and 7'.

Also, as shown in FIG. 10, the first transmission line TL1 and the second transmission line TL2 connected to the eighth current generating portion VCCS 8 may be denoted by reference numerals 0 and 0', the first transmission line TL1 and the second transmission line TL2 connected to the ninth current generating portion VCCS 9 may be denoted by reference numerals 1 and 1', the first transmission line TL1 and the second transmission line TL2 connected to the tenth current generating portion VCCS 10 may be denoted by reference numerals 2 and 2', and the first transmission line TL1 and the second transmission line TL2 connected to the eleventh current generating portion VCCS 11 may be denoted by reference numerals 3 and 3'.

That is, in the group sensing portion GSU and the six sensing portions 824 adjacent to the group sensing portion GSU, the eight of first transmission lines TL1 and the eight of second transmission lines TL2 are required to sense both the contact touch and the hover touch.

However, among the sixteen transmission lines, one of the first transmission line TL1 or one of the second transmission line TL2 is connected another group sensing portion GSU, whereby the fifteen transmission lines TL1 and TL2 may be substantially required in order to sense both the contact touch and the hover touch in the group sensing portion GSU and the six sensing portions 824 adjacent to the group sensing portion GSU.

Additionally, the sixteen transmission lines TL1 and TL2 may be provided in the routing portion 820b of the touch determining unit 820 shown in FIG. 10, whereby the touch determining unit 820 may sense the contact touch and the hover touch.

The first routing line LL1 and the second routing line LL2 may be connected to the first transmission line TL1 connected to the current generating portion 821, and the third routing line LL3 and the fourth routing line LL4 may be connected to the second transmission line TL2 connected to the current generating portion 821.

In this case, the first routing line LL1 and the second routing line LL2 may be connected to the different sensing portions 824, however, may be connected to the same sensing portion 824, for example, the group sensing portion GSU.

Also, the third routing line LL3 and the fourth routing line LL4 may be connected to the different sensing portions 824, however, may be connected to the same sensing portion 824, for example, the group sensing portion GSU.

Also, the first routing line LL1, the second routing line LL2, the third routing line LL3, and the fourth routing line LL4 may be connected to the different sensing portions 824. In this case, the first routing line LL1 and the third routing line LL3 may be connected to the different group sensing portions GSU, respectively.

In the switching portion 823 connected to the sensing portion 824 driven only in the contact touch sensing mode CT, only two switches 823a may be provided therein. In the switching portion 823 connected to the sensing portion 824 driven in the contact touch sensing mode CT and the hover touch sensing mode HT, the eight switches 823a may be provided therein.

However, in order to reduce a characteristic deviation between the switching portions 823, as shown in FIG. 10, the eight switches 823a may be provided in each of the switching portions 823, and eight or more switches 823a may be supplementarily provided in the switching portion 823.

Each of the eight switches 823a connected to the group sensing portion GSU may be connected to the touch receiving electrode line RXL through the routing portion 820b and the current generating portion 821.

When the contact touch sensing mode CT is started, as shown in FIG. 12, the two switches 823a connected to the two touch receiving electrodes lines RXL adjacent to each other are turned-on in all the switching portions 823 in response to the touch control signal TCS transmitted from the control driver 400 or the control signal generated in the touch driver 800 by the touch control signal TCS.

For example, the switch 823a connected to the zeroth touch receiving electrode line RXL0 and the switch 823a connected to the first touch receiving electrode line RXL1 are turned-on in the switching portion 823 connected to the zeroth sensing portion AFE0.

Also, in the switching portion 823 connected to the first sensing portion AFE1, the switch 823a connected to the first touch receiving electrode line RXL1 and the switch 823a connected to the second touch receiving electrode line RXL2 are turned-on.

Also, in the switching portion 823 connected to the third sensing portion AFE3, the switch 823a connected to the third touch receiving electrode line RXL3 and the switch 823a connected to the fourth touch receiving electrode line RXL4 are turned-on.

Accordingly, in each of the sensing portions 824, it is possible to determine whether a touch occurs by using the touch sensing signals TS received in the two touch receiving electrode lines RXL adjacent to each other.

When the hover touch sensing mode HT is started, as shown in FIG. 13, all the eight switches 823a included in the switching portions 823 connected to the group sensing portion GSU among the sensing portions 824 are turned-on in response to the touch control signal TCS transmitted from the control driver 400 or the control signal generated in the touch driver 800 by the touch control signal TCS.

For example, the switches 823a connected to the zeroth touch receiving electrode line RXL0 to the seventh touch receiving electrode line RXL7 are turned-on in the switching portion 823 connected to the third sensing portion AFE3.

Also, in the switching portion 823 connected to the seventh sensing portion AFE7, the switches 823a connected to the fourth touch receiving electrode line RXL4 to the eleventh touch receiving electrode line RXL11 are turned-on.

Also, in the switching portion 823 connected to the eleventh sensing portion AFE11, the switches 823a connected to the eighth touch receiving electrode line RXL8 to the fifteenth touch receiving electrode line RXL15 are turned-on.

Accordingly, in each of the group sensing portions GSU, that is, the third sensing portion AFE3, the seventh sensing portion AFE7, and the eleventh sensing portion AFE11, it is possible to determine whether a touch occurs by using the touch sensing signals TS received in the eight touch receiving electrode lines RXL adjacent to each other.

That is, according to the display device according to an embodiment of the present disclosure, a touch may be sensed by using the two touch sensing signals TS transmitted from the two touch receiving electrode lines RXL adjacent to each other in the contact touch sensing mode CT. In particular, the touch sensing signal TS received in the sensing portion 824 is a signal having the same or similar characteristics as the touch sensing signal TS transmitted from the touch receiving electrode line RXL.

Thus, even when the sensing portion 824 senses a touch by using the differential method, it is possible to accurately determine whether a contact touch occurs.

Also, even if all the sensing portions 824 are driven once, a touch on the entire surface of the touch panel 100b may be sensed.

According to the display device according to an embodiment of the present disclosure, in the hover touch sensing mode HT, a touch may be sensed by using the eight touch sensing signals TS transmitted from the eight touch receiving electrode lines RXL adjacent to each other.

Thus, even if the sensing portion 824 senses a touch by using the differential method, it is possible to accurately determine whether a hover touch occurs.

Then, the structure and function of the touch determining unit 820 when 'n' is 1 will be described with reference to FIG. 14.

When 'n' is 1, the touch determining unit 820 may group the two touch receiving electrode lines RXL adjacent to each other into a group in the hover touch sensing mode HT and may determine whether a group touch occurs by using the touch sensing signals TS received from the four touch receiving electrode lines RXL adjacent to each other.

In this case, as shown in FIG. 14, the zeroth touch receiving electrode line RXL0 and the first touch receiving electrode line RXL1 may be included in the first group G1, the second touch receiving electrode line RXL2 and the third touch receiving electrode line RXL3 may be included in the second group G2, the fourth touch receiving electrode line RXL4 and the fifth touch receiving electrode line RXL5 may be included in the third group G3, and the sixth touch receiving electrode line RXL6 and the seventh touch receiving electrode line RXL7 may be included in the fourth group G4.

Each of the touch receiving electrode lines RXL may be connected to the current generating portions 821.

Each of the current generating portions 821 may be connected to the first transmission line TL1 and the second transmission line TL2.

In the following description, as shown in FIG. 14, the first transmission line TL1 and the second transmission line TL2 connected to the zeroth current generating portion VCCS 0 may be denoted by reference numerals 0 and 0', the first transmission line TL1 and the second transmission line TL2 connected to the first current generating portion VCCS 1 may be denoted by reference numerals 1 and 1', and the first transmission line TL1 and the second transmission line TL2 connected to the third current generating portion VCCS 3 may be denoted by reference numerals 3 and 3'.

Also, as shown in FIG. 14, the first transmission line TL1 and the second transmission line TL2 connected to the fourth current generating portion VCCS 4 may be denoted by reference numerals 0 and 0', the first transmission line TL1 and the second transmission line TL2 connected to the fifth current generating portion VCCS 5 may be denoted by reference numerals 1 and 1', the first transmission line TL1 and the second transmission line TL2 connected to the sixth current generating portion VCCS 6 may be denoted by reference numerals 2 and 2', and the first transmission line TL1 and the second transmission line TL2 connected to the seventh current generating portion VCCS 7 may be denoted by reference numerals 3 and 3'.

That is, in the group sensing portion GSU and the two sensing portions 824 adjacent to the group sensing portion GSU, the four of first transmission lines TL1 and the four of second transmission lines TL2 are required to sense both the contact touch and the hover touch.

However, among the eight transmission lines, one of the first transmission line TL1 or one of the second transmission line TL2 is connected another group sensing portion GSU, whereby the seven transmission lines TL1 and TL2 may be substantially required in order to sense both the contact touch and the hover touch in the group sensing portion GSU and the two sensing portions 824 adjacent to the group sensing portion GSU.

Additionally, the eight transmission lines TL1 and TL2 may be provided in the routing portion 820b of the touch determining unit 820 shown in FIG. 14, whereby the touch determining unit 820 may sense the contact touch and the hover touch.

In this case, the arrangement structure of the eight transmission lines TL1 and TL2 shown in FIG. 14 is different from the arrangement structure of the sixteen transmission lines TL1 and TL2 shown in FIG. 10. However, the eight transmission lines TL1 and TL2 shown in FIG. 14 may be provided in the arrangement structure similar to that of the sixteen transmission lines TL1 and TL2 shown in FIG. 10.

The first routing line LL1 and the second routing line LL2 may be connected to the first transmission line TL1 connected to the current generating portion 821, and the third routing line LL3 and the fourth routing line LL4 may be connected to the second transmission line TL2 connected to the current generating portion 821.

In this case, the first routing line LL1 and the second routing line LL2 may be connected to the different sensing portions 824, however, may be connected to the same sensing portion 824, for example, the group sensing portion GSU.

Also, the third routing line LL3 and the fourth routing line LL4 may be connected to the different sensing portions 824, however, may be connected to the same sensing portion 824, for example, the group sensing portion GSU.

However, the first routing line LL1, the second routing line LL2, the third routing line LL3, and the fourth routing line LLA are not connected to the different sensing portions 824.

For example, in the touch determining unit 820 shown in FIG. 10, the first routing line LL1, the second routing line LL2, the third routing line LL3, and the fourth routing line LL4 may be connected to the different sensing portions 824. In this case, the first routing line LL1 and the third routing line LL3 may be connected to the different group sensing portions GSU, respectively.

However, in the touch determining unit 820 shown in FIG. 14, when the first routing line LL1 and the second routing line LL2 are connected to the group sensing portion GSU, the third routing line LL3 and the fourth routing line LL4 are connected to the different sensing portions 824.

Also, in the touch determining unit 820 shown in FIG. 14, when the third routing line LL3 and the fourth routing line LLA are connected to the group sensing portion GSU, the first routing line LL1 and the second routing line LL2 are connected to the different sensing portions 824.

In the switching portion 823 connected to the sensing portion 824 driven only in the contact touch sensing mode CT, only two switches 823a may be provided therein. In the switching portion 823 connected to the sensing portion 824 driven in the contact touch sensing mode CT and the hover touch sensing mode HT, the four switches 823a may be provided therein.

However, in order to reduce a characteristic deviation between the switching portions 823, as shown in FIG. 14, the four switches 823a may be provided in each of the switching portions 823, and four or more switches 823a may be supplementarily provided in the switching portion 823.

Each of the eight switches 823a connected to the group sensing portion GSU may be connected to the touch receiving electrode line RXL through the routing portion 820b and the current generating portion 821.

When the contact touch sensing mode CT is started, the two switches 823a connected to the two touch receiving electrodes lines RXL adjacent to each other are turned-on in all the switching portions 823 in response to the touch control signal TCS transmitted from the control driver 400 or the control signal generated in the touch driver 800 by the touch control signal TCS.

For example, the switch 823a connected to the zeroth touch receiving electrode line RXL0 and the switch 823a connected to the first touch receiving electrode line RXL1 are turned-on in the switching portion 823 connected to the zeroth sensing portion AFE0.

Also, in the switching portion 823 connected to the first sensing portion AFE1, the switch 823a connected to the first touch receiving electrode line RXL1 and the switch 823a connected to the second touch receiving electrode line RXL2 are turned-on.

Also, in the switching portion 823 connected to the third sensing portion AFE3, the switch 823a connected to the third touch receiving electrode line RXL3 and the switch 823a connected to the fourth touch receiving electrode line RXL4 are turned-on.

Accordingly, in each of the sensing portions 824, it is possible to determine whether a touch occurs by using the touch sensing signals TS received in the two touch receiving electrode lines RXL adjacent to each other.

When the hover touch sensing mode HT is started, all the four switches 823a included in the switching portions 823 connected to the group sensing portion GSU among the sensing portions 824 are turned-on in response to the touch control signal TCS transmitted from the control driver 400 or the control signal generated in the touch driver 800 by the touch control signal TCS.

For example, all the switches 823a connected to the zeroth touch receiving electrode line RXL0 to the third touch receiving electrode line RXL3 are turned-on in the switching portion 823 connected to the first sensing portion AFE1.

Also, in the switching portion 823 connected to the third sensing portion AFE3, all the switches 823a connected to the second touch receiving electrode line RXL2 to the fifth touch receiving electrode line RXL5 are turned-on.

Also, in the switching portion 823 connected to the fifth sensing portion AFE5, all the switches 823a connected to the fourth touch receiving electrode line RXL4 to the seventh touch receiving electrode line RXL7 are turned-on.

Accordingly, in each of the group sensing portions GSU, that is, the first sensing portion AFE1, the third sensing portion AFE3, and the fifth sensing portion AFE5, it is possible to determine whether a touch occurs by using the touch sensing signals TS received in the four touch receiving electrode lines RXL adjacent to each other.

That is, according to the display device according to an embodiment of the present disclosure, a touch may be sensed by using the two touch sensing signals TS transmitted from the two touch receiving electrode lines RXL adjacent to each other in the contact touch sensing mode CT.

Also, according to the display device according to an embodiment of the present disclosure, in the hover touch sensing mode HT, a touch may be sensed by using the four touch sensing signals TS transmitted from the four touch receiving electrode lines RXL adjacent to each other.

Next, finally, the structure and function of the touch determining unit 820 when 'n' is 3 will be described with reference to FIG. 15. In FIG. 15, for convenience of explanation, only the switching portions 823 connected to the zeroth sensing portion AFE0 and the seventh sensing portion AFE7 are shown.

When 'n' is 3, the touch determining unit 820 may group the eight touch receiving electrode lines RXL adjacent to each other into a group in the hover touch sensing mode HT and may determine whether a group touch occurs by using the touch sensing signals TS received from the eight touch receiving electrode lines RXL adjacent to each other.

In this case, as shown in FIG. 15, the zeroth touch receiving electrode line RXL0 to the seventh touch receiving electrode line RXL7 may be included in the first group G1, and the eighth touch receiving electrode line RXL8 to the fifteenth touch receiving electrode line RXL15 may be included in the second group G2.

Each of the touch receiving electrode lines RXL may be connected to the current generating portions 821.

Each of the current generating portions 821 may be connected to the first transmission line TL1 and the second transmission line TL2.

In the following description, as shown in FIG. 15, the first transmission line TL1 and the second transmission line TL2 connected to the zeroth current generating portion VCCS 0 may be denoted by reference numerals 0 and 0', the first transmission line TL1 and the second transmission line TL2 connected to the first current generating portion VCCS 1 may be denoted by reference numerals 1 and 1', and the first transmission line TL1 and the second transmission line TL2 connected to the fifteenth current generating portion VCCS 15 may be denoted by reference numerals 15 and 15'.

That is, in the group sensing portion GSU and the sensing portions 824 adjacent to the group sensing portion GSU, the sixteen of first transmission lines TL1 and the sixteen of second transmission lines TL2 are required to sense both the contact touch and the hover touch.

However, among the thirty-two transmission lines, one of the first transmission line TL1 or one of the second transmission line TL2 is connected another group sensing portion GSU, whereby the thirty-one transmission lines TL1 and TL2 may be substantially required in order to sense both the contact touch and the hover touch in the group sensing portion GSU and the sensing portions 824 adjacent to the group sensing portion GSU.

Additionally, the thirty-two transmission lines TL1 and TL2 may be provided in the routing portion 820b of the touch determining unit 820 shown in FIG. 15, whereby the touch determining unit 820 may sense the contact touch and the hover touch.

The first routing line LL1 and the second routing line LL2 may be connected to the first transmission line TL1 connected to the current generating portion 821, and the third routing line LL3 and the fourth routing line LL4 may be connected to the second transmission line TL2 connected to the current generating portion 821.

In this case, the first routing line LL1 and the second routing line LL2 may be connected to the different sensing portions 824, however, may be connected to the same sensing portion 824, for example, the group sensing portion GSU.

Also, the third routing line LL3 and the fourth routing line LL4 may be connected to the different sensing portions 824, however, may be connected to the same sensing portion 824, for example, the group sensing portion GSU.

That is, the connection structure of the first to fourth routing lines LL1 to LLA provided in the touch determining unit 820 shown in FIG. 15 may be similar to the connection structure of the first to fourth routing lines LL1 to LL4 provided in the touch determining unit 820 shown in FIG. 10.

In the switching portion 823 connected to the sensing portion 824 driven only in the contact touch sensing mode CT, only two switches 823a may be provided therein. In the switching portion 823 connected to the sensing portion 824 driven in the contact touch sensing mode CT and the hover touch sensing mode HT, the sixteen switches 823a may be provided therein.

However, in order to reduce a characteristic deviation between the switching portions 823, as shown in FIG. 15, the sixteen switches 823a may be provided in each of the switching portions 823, and sixteen or more switches 823a may be supplementarily provided in the switching portion 823.

Each of the sixteen switches 823a connected to the group sensing portion GSU may be connected to the touch receiving electrode line RXL through the routing portion 820b and the current generating portion 821.

When the contact touch sensing mode CT is started, the two switches 823a connected to the two touch receiving electrodes lines RXL adjacent to each other are turned-on in all the switching portions 823 in response to the touch control signal TCS transmitted from the control driver 400 or the control signal generated in the touch driver 800 by the touch control signal TCS.

For example, the switch 823a connected to the zeroth touch receiving electrode line RXL0 and the switch 823a connected to the first touch receiving electrode line RXL1 are turned-on in the switching portion 823 connected to the zeroth sensing portion AFE0.

Also, in the switching portion 823 connected to the first sensing portion, the switch 823a connected to the first touch receiving electrode line RXL1 and the switch 823a connected to the second touch receiving electrode line RXL2 are turned-on.

Also, in the switching portion 823 connected to the third sensing portion, the switch 823a connected to the third touch receiving electrode line RXL3 and the switch 823a connected to the fourth touch receiving electrode line RXL4 are turned-on.

Accordingly, in each of the sensing portions 824, it is possible to determine whether a touch occurs by using the touch sensing signals TS received in the two touch receiving electrode lines RXL adjacent to each other.

When the hover touch sensing mode HT is started, all the sixteen switches 823a included in the switching portions 823 connected to the group sensing portion GSU among the sensing portions 824 are turned-on in response to the touch control signal TCS transmitted from the control driver 400 or the control signal generated in the touch driver 800 by the touch control signal TCS.

For example, in the switching portion 823 connected to the seventh sensing portion AFE7, the switches 823a connected to the zeroth touch receiving electrode line RXL0 to the fifteenth touch receiving electrode line RXL15 are turned-on.

Accordingly, in each of the group sensing portions GSU, that is, the seventh sensing portion AFE7, the fourteenth sensing portion AFE14, and the twenty-first sensing portion AFE21, it is possible to determine whether a touch occurs by using the touch sensing signals TS received in the sixteen touch receiving electrode lines RXL adjacent to each other.

That is, according to the display device according to an embodiment of the present disclosure, a touch may be sensed by using the two touch sensing signals TS transmitted from the two touch receiving electrode lines RXL adjacent to each other in the contact touch sensing mode CT.

Also, according to the display device according to an embodiment of the present disclosure, in the hover touch sensing mode HT, a touch may be sensed by using the sixteen touch sensing signals TS transmitted from the sixteen touch receiving electrode lines RXL adjacent to each other.

The characteristics of the display device according to an embodiment of the present disclosure are as follows.

The display device according to an embodiment of the present disclosure may be applied to various types of electronic devices, and more particularly, may be applied to a wearable device and may use a sensing structure based on a wearable touch driving technology.

A touch panel applied to the wearable apparatus needs to sense not only the general contact touch but also the hover touch. The display device according to an embodiment of the present disclosure may generate the first copy touch sensing signal and the second copy touch sensing signal by copying the touch sensing signal in order to improve sensing sensitivity in the contact touch sensing mode and the hover touch sensing mode and may group the touch receiving electrode lines RXL adjacent to each other in a group in order to improve sensing sensitivity in the hover touch sensing mode.

That is, the display device according to an embodiment of the present disclosure may group the touch receiving electrode lines RXL adjacent to each other in a group in order to prevent the sensitivity from being lowered due to dispersion of charges in the differential simultaneous sensing and to prevent the sensitivity from being lowered in the hover touch sensing.

In the display device according to an embodiment of the present disclosure, the touch determining unit 820 may include the mirror portion 820a including the current generation portion (voltage control current source) 821, the routing portion 820b, the mode switching portion 820c, and the signal processing portion (Charge Amp, Gain Stage, Integrator, etc.) 820d. Accordingly, the touch receiving electrode line RXL may be connected to the sensing portion 824 through the simple connection structure among the mirror portion 820a, the routing portion 820b, the mode switching portion 820c, and the signal processing portion 820d.

That is, the touch sensing signals TS transmitted from the touch receiving electrode lines RXL may be summed at the front end of the sensing portion 824, and all the current generating portions 821 connected to the touch receiving electrode lines RXL may be utilized, whereby it is possible to cope with a heavy load.

A current mirror may be used to prevent or at least reduce the sensitivity distribution in the differential simultaneous sensing and to distribute the same current to the sensing portions in the differential simultaneous sensing. That is, the current generating portion 821 may be the current mirror.

In this case, the size of the current mirror may be changed according to the number of the sensing portions 824.

The display device according to an embodiment of the present disclosure may include the current generating portion (Voltage Control Current Source VCCS) 821 for driving and sensing a load (capacitance) of the touch panel 100b, the routing portion 820b for transferring charges generated in the touch receiving electrode RX to the two sensing portions 824 without the sensitivity distribution, the switching portion 823 for transmitting the touch charge (touch sensing signal) to the sensing portions 824 according to a binding option, and the sensing portion 824 for converting the charge amount of the touch sensing signal TS into the voltage and performing the signal process (Gain Stage, Integrator, etc.).

The current generating portion 821 may be configured as the current mirror so that the amount of charge transferred to the two adjacent sensing portions 824 is not distributed, and the same current is output to the two adjacent sensing portions 824. The first current mirror branch 821b and the second current mirror branch 821c shown in FIG. 11 are circuits for equally copying the current generated from the voltage follower of front stage.

According to an embodiment of the present disclosure, the above-described structures enable to prevent the deterioration in sensing sensitivity.

The number of switches 823a included in each of the switching portions 823 may be different from each other, however, may be the same in order to adjust offset difference between the switching portions 823.

The features of the display device according to an embodiment of the present disclosure may be briefly summarized as follows.

The display device according to an embodiment of the present disclosure includes the image panel provided with the pixels, the touch panel including the touch driving electrodes and touch receiving electrodes provided on the image panel, and the touch driver for sensing a touch on the touch panel, wherein the touch driver determines whether a touch occurs on the touch panel by using the first copy touch sensing signal and the second copy touch sensing signal corresponding to the touch sensing signal transmitted from the touch receiving electrode line connected to the touch receiving electrode.

The touch driver determines whether a normal touch occurs by using the touch sensing signals received from the two touch receiving electrode lines adjacent to each other in the contact touch sensing mode, and the touch driver determines whether a group touch occurs by using the touch sensing signals received from the '2*2‴' ('n' is a natural number, and '2‴' is the number of touch receiving electrode lines grouped together) touch receiving electrode lines adjacent to each other in the hover touch sensing mode.

The touch driver includes the mirror portion connected to touch receiving electrode lines, the mode switching portion including the switching portions connected to the mirror portion, and the signal processing portion including the sensing portions connected to the switching portions, wherein the mirror portion includes the current generating portions connected to the touch receiving electrode lines, each of the current generating portions generates the first copy touch sensing signal and the second copy touch sensing signal, and each of the sensing portions is connected to the two touch receiving electrode lines adjacent to each other through the switching portion in the contact touch sensing mode.

Each of the current generating portion outputs the first copy touch sensing signal and the second copy touch sensing signal corresponding to the touch sensing signal transmitted from the touch receiving electrode line to the first transmission line and the second transmission line.

The first transmission line is connected to at least one switching portion connected to at least one current generating portion, and the second transmission line is connected to at least one switching portion connected to at least one current generating portion.

The first transmission line may be connected to the first routing line and the second routing line, the second transmission line may be connected to the third routing line and the fourth routing line, the first routing line may be connected to the group sensing portion configured to determine whether a group touch occurs among the sensing portions in the hover touch sensing mode, the second routing line may be connected to the normal sensing portion configured to determine whether a normal touch occurs among the sensing portions in the contact touch sensing mode, the third routing line may be connected to another group sensing portion spaced apart from the group sensing portion with the '2″−1' normal sensing portions interposed therebetween, and the fourth routing line may be connected to another normal sensing portion adjacent to the normal sensing portion connected to the second routing line.

The group sensing portion connected to the first routing line and the normal sensing portion connected to the second routing line are the same sensing portion.

Another group sensing portion connected to the third routing line and another normal sensing portion connected to the fourth routing line are the same sensing portion.

Each of the current generating portions generates the first copy touch sensing signal and the second copy touch sensing signal corresponding to the touch sensing signal transmitted from the touch receiving electrode line and transmits the first copy touch sensing signal and the second copy touch sensing signal to the signal processing portion.

Among the sensing portions, the (2″*m−1)th sensing portion ('m' is a natural number) is connected to the two touch receiving electrode lines adjacent to each other through the switching portion in the contact touch sensing mode, and is connected to the '2*2‴' touch receiving electrode lines adjacent to each other through the switching portion in the hover touch sensing mode.

Each of the switching portions includes the two switches, and the switching portion connected to the (2″*m−1)th sensing portion ('m' is a natural number) among the switching portions includes the '2*2‴' switches.

The two switches are connected to the two touch receiving electrode lines adjacent to each other.

The '2*2‴' switches are connected to the '2*2‴' touch receiving electrode lines adjacent to each other.

The sensing portions include the normal sensing portions for determining whether a touch occurs by using the touch sensing signals received from the two touch receiving electrode lines adjacent to each other in the contact touch sensing mode. Among the sensing portions, the two sensing portions spaced apart from each other with the '2″−1' sensing portions interposed therebetween are the group sensing portions configured to determine whether a touch occurs by using the touch sensing signals received from the '2*2‴' touch receiving electrode lines adjacent to each other in the hover touch sensing mode.

In the case of the display device according to an embodiment of the present disclosure, in the contact touch sensing mode in which a contact touch is sensed, the first copy touch sensing signal and the second copy touch sensing signal corresponding to the touch sensing signal transmitted from the touch receiving electrode line may be simultaneously transmitted to the two sensing portions.

That is, it is possible to determine whether a touch occurs in the touch electrode by using the first copy touch sensing signal and the second copy touch sensing signal having the same size and characteristics.

Therefore, according to the display device according to an embodiment of the present disclosure, a touch may be sensed without distributing the touch sensing signal transmitted from the touch receiving electrode line. Accordingly, touch sensitivity may be improved.

In addition, according to the display device according to an embodiment of the present disclosure, whether a touch occurs or not may be simultaneously sensed in the sensing portions, whereby sensing time may be reduced.

Accordingly, it is possible to rapidly perform the contact touch sensing mode for sensing a touch by contact and the hover touch sensing mode for sensing a touch by non-contact such as the hover finger touch and hover gesture touch.

Also, in the display device according to an embodiment of the present disclosure, a touch may be sensed by using the touch sensing signals received from at least two touch receiving electrode lines adjacent to each other and grouped together in the hover touch sensing mode.

Accordingly, the touch sensitivity may be improved.

The display device according to an embodiment of the present disclosure may be applied to all electronic devices including an image panel. For example, the display device according to an embodiment of the present disclosure may be applied to a virtual reality VR device, an augmented reality AR device, a mobile device, a video phone, a smart watch, a watch phone, a wearable device, a foldable device, a rollable device, a bendable device, a flexible device, a curved device, an electronic notebook, an electronic book, a portable multimedia player PMP, a personal digital assistant PDA, an MP3 player, a mobile medical device, a desktop PC, a laptop PC, a netbook computer, a workstation, a navigation device, a vehicle navigation device, a vehicle display device, a television, a wall paper display device, a signage device, a game device, a notebook, a monitor, a camera, a camcorder, a home appliance, and etc.

The features, structures, effects, and the like described in the various examples of the disclosure described above are included in at least one example of the present disclosure and are not necessarily limited to only one example. In addition, the features, structures, effects, and the like illustrated in at least one example of the present disclosure may be combined or modified for other examples by a person skilled in the art to which the technical idea of the present disclosure belongs. Therefore, the contents related to the combination and the deformation should be construed as being included in the technical scope or the scope of the present disclosure.

Although the present disclosure described above is not limited to the above-described embodiments and the accompanying drawings, it will be apparent to those skilled in the art that various substitutions, modifications, and changes are possible without departing from the spirit and scope of the present disclosure. Therefore, the scope of the present disclosure is represented by the following claims, and all changes or modifications derived from the meaning and scope of the claims and equivalents thereof should be construed as being included in the scope of the present disclosure.

What is claimed is:

1. A display device comprising:
an image panel having pixels;
a touch panel including touch driving electrodes and touch receiving electrodes on the image panel; and
a touch driver configured to sense a touch on the touch panel,
wherein the touch driver determines whether the touch occurs in the touch panel by using a first copy touch sensing signal and a second copy touch sensing signal corresponding to a touch sensing signal transmitted from a touch receiving electrode line that is connected to the touch receiving electrodes,
wherein the touch driver determines whether a normal touch occurs by using touch sensing signals received from two touch receiving electrode lines that are adjacent to each other in a contact touch sensing mode, and
the touch driver determines whether a group touch occurs by using touch sensing signals received from $2*2^n$ ('n' is a natural number and '$2^n$' is a number of touch receiving electrode lines grouped together) touch receiving electrode lines that are adjacent to each other in a hover touch sensing mode.

2. The display device of claim 1, wherein the touch driver includes:
a mirror portion connected to touch receiving electrode lines;
a mode switching portion including switching portions that are connected to the mirror portion; and
a signal processing portion including sensing portions connected to the switching portions,
wherein the mirror portion includes current generating portions connected to the touch receiving electrode lines,
each of the current generating portions generates the first copy touch sensing signal and the second copy touch sensing signal, and
each of the sensing portions is connected to two touch receiving electrode lines that are adjacent to each other through the switching portions in the contact touch sensing mode.

3. The display device of claim 2, wherein each of the current generating portions outputs the first copy touch sensing signal and the second copy touch sensing signal corresponding to the touch sensing signal transmitted from the touch receiving electrode line to a first transmission line and a second transmission line.

4. The display device of claim 3, wherein the first transmission line is connected to at least one switching portion from the switching portions that is connected to at least one current generation portion from the current generating portions and the second transmission line is connected to at least one switching portion from the switching portions that is connected to at least one current generation portion from the current generating portions.

5. The display device of claim 4, wherein the first transmission line is connected to a first routing line and a second routing line,
the second transmission line is connected to a third routing line and a fourth routing line,
the first routing line is connected to a group sensing portion that determines whether a group touch occurs among the sensing portions in the hover touch sensing mode,
the second routing line is connected to a normal sensing portion that determines whether a normal touch occurs among the sensing portions in the contact touch sensing mode,
the third routing line is connected to another group sensing portion spaced apart from the group sensing portion with $2^{n-1}$ normal sensing portions interposed therebetween, and
the fourth routing line is connected to another normal sensing portion adjacent to the normal sensing portion connected to the second routing line.

6. The display device of claim 5, wherein the group sensing portion connected to the first routing line and the normal sensing portion connected to the second routing line are a same sensing portion.

7. The display device of claim 5, wherein another group sensing portion connected to the third routing line and another normal sensing portion connected to the fourth routing line are a same sensing portion.

8. The display device of claim 2, wherein each of the current generating portions generates the first copy touch sensing signal and the second copy touch sensing signal corresponding to the touch sensing signal transmitted from the touch receiving electrode line and transmits the first copy touch sensing signal and the second copy touch sensing signal to the signal processing portion.

9. The display device of claim 2, wherein a $(2^n*m-1)$th sensing portion ('n' is a natural number) among the sensing portions is connected to the two touch receiving electrode lines that are adjacent to each other through the switching portion in the contact touch sensing mode, wherein m is a natural number, and
the $(2^n*m-1)$th sensing portion is connected to '$2*2^n$' touch receiving electrode lines adjacent to each other through the switching portion in the hover touch sensing mode.

10. The display device of claim 2, wherein each of the switching portions includes two switches and the switching portion connected to a $(2^n*m-1)$th sensing portion among the switching portions includes '$2*2^n$' switches.

11. The display device of claim 10, wherein the two switches are connected to the two touch receiving electrode lines adjacent to each other.

12. The display device of claim 10, wherein the '$2*2^n$' switches are connected to the '$2*2^n$' touch receiving electrode lines adjacent to each other.

13. The display device of claim 2, wherein the sensing portions include normal sensing portions that determine whether a touch occurs by using the touch sensing signals received from the two touch receiving electrode lines that are adjacent to each other in the contact touch sensing mode, and two sensing portions spaced apart from each other with '$2^n-1$' sensing portions interposed therebetween are the group sensing portions which determine whether a touch occurs by using the touch sensing signals received from the '$2*2^n$' touch receiving electrode lines adjacent to each other in the hover touch sensing mode.

\* \* \* \* \*